Jan. 20, 1959 G. ELLIOTT 2,870,263

RADIO OR CARRIER TERMINAL DIAL SELECTOR

Filed Feb. 25, 1955 11 Sheets-Sheet 1

INVENTOR.
GEORGE ELLIOTT

BY [signature]
ATTORNEY

Jan. 20, 1959 G. ELLIOTT 2,870,263

RADIO OR CARRIER TERMINAL DIAL SELECTOR

Filed Feb. 25, 1955 11 Sheets-Sheet 3

Jan. 20, 1959 G. ELLIOTT 2,870,263

RADIO OR CARRIER TERMINAL DIAL SELECTOR

Filed Feb. 25, 1955 11 Sheets-Sheet 4

DIAL TRUNK SELECTOR 114

RADIO OR CARRIER TERMINAL DIAL SELECTOR

RADIO OR CARRIER TERMINAL DIAL SELECTOR

RADIO OR CARRIER TERMINAL DIAL SELECTOR 2,870,263
Patented Jan. 20, 1959

2,870,263

RADIO OR CARRIER TERMINAL DIAL SELECTOR

George Elliott, Rochester, N. Y., assignor, by mesne assignments, to General Dynamics Corporation, a corporation of Delaware Application February 25, 1955, Serial No. 490,581
17 Claims. (Cl. 179—41)

This invention relates to microwave radio link telephone systems, and more particularly to selector switches and conference call systems for use in microwave radio link or carrier terminals.

Recently, microwave radio relay networks have replaced pole line construction in many instances. One of the characteristics of a microwave network is that it must have repeater stations located at spaced intervals along the length of the system. This characteristic also coincides with that of certain special type maintenance, communication, control or other systems, such as is found on toll roads, for example. That is, a characteristic of a toll road network is to provide toll houses, police stations, maintenance crews and the like which are distributed at intervals along the length of the road system. Therefore, it is economical to use a microwave network wherein each repeater station is provided with means for serving a toll house, a maintenance establishment or other location. In this case, a considerable savings of time and personnel may be had if the telephone network is arranged on a dial basis so that any subscriber may dial and speak with any other subscriber.

It seems obvious that it is also necessary to provide for a plurality of subscribers at some central location, as by means of a private branch exchange (P. B. X), for example. On occasions both the radio link subscribers and the P. B. X subscribers may want to establish a conference call involving a plurality of subscribers. On calls of this type the signal current drops-off rapidly as each telephone is added in the conference call circuit. It is necessary to provide some means for compensating for this drop in signal current if satisfactory service is to continue. One method of compensating is to amplify the signal current while another method is to use an amplifier to provide gain for a derived signal which may then be fed back into the conference call circuit in a manner which effects the impedance characteristics of the circuit. This is called "negative impedance."

Therefore, one object of this invention is to provide a dial controlled switching system to operate into a microwave radio network.

Another object of this invention is to provide new and improved telephone selector switches.

A further object of this invention is to provide means for preventing a subscriber from operating a selector switch associated with a busy channel.

A still further object of this invention provides means to permit the calling subscriber either to listen-in on a busy channel or to receive a busy signal indicating that he may not complete his call.

Still a further object of this invention is to provide a new and improved two speed interrupter.

Still another object of this invention is to provide means for utilizing a channel of a microwave system on a party line basis.

Another object of this invention is to provide a new and improved hybrid control circuit.

Yet another object of this invention is to provide battery feed from a trunk selector on incoming calls to local stations in a cordless P. B. X.

These objects are accomplished in one form of the subject invention by means of a single motion selector switch which is operated to register a first digit of a called number, to drop-back, and then to reoperate to register the second digit of the called number. Responsive to these two registration motions of the selector switch, means is provided for selectively signaling one of the subscribers who then may talk over the common microwave channel.

A self-interrupting relay is provided to operate at one rate of speed while making and breaking a circuit including the output of a tone generator and to operate at another rate of speed while making and breaking a circuit including the output of a ringing generator. The rate of speed of the relay is switched responsive to the second of the two registration motions of the selector switch. In this manner a busy tone signal is given at most stations while ringing current is provided at a called station.

Certain special features are also provided. For example, the selector may seize either a dial switching exchange, or a cordless P. B. X exchange, either of which may be used to extend the call further. The P. B. X is provided with a bright-dim supervisory lamp which glows brightly when an unanswered call is on a local line, glows dimly during a conference call, and is extinguished for on-hook supervision.

An all-transistor amplifier is used to provide negative impedance to compensate for the number of stations that are added in a conference call.

These and other objects will be obvious to those skilled in the art from the following description of the accompanying drawings in which.

Figure 6:
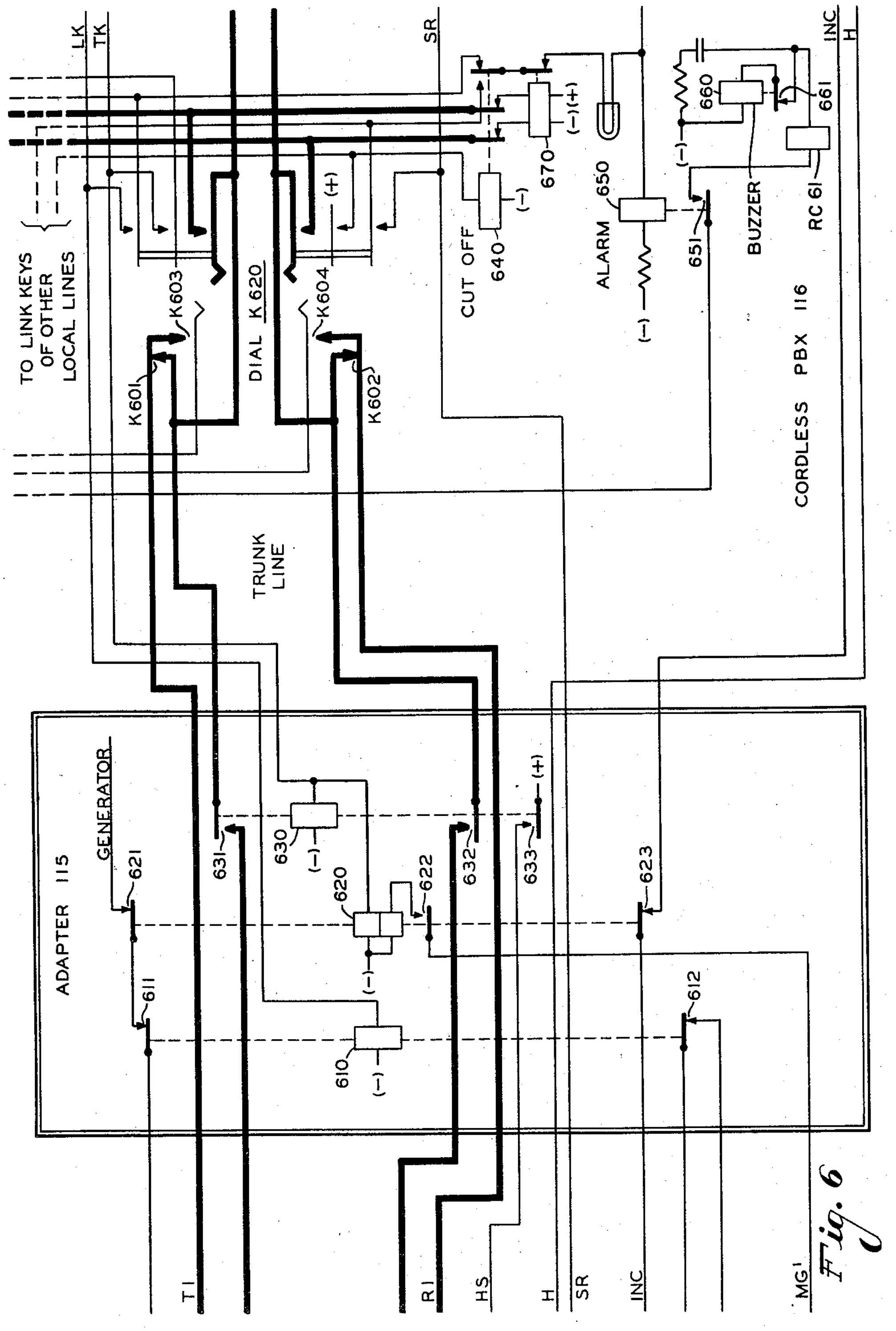

Fig. 6 shows an adapter circuit and part of a cordless P. B. X circuit; while

Figure 7:
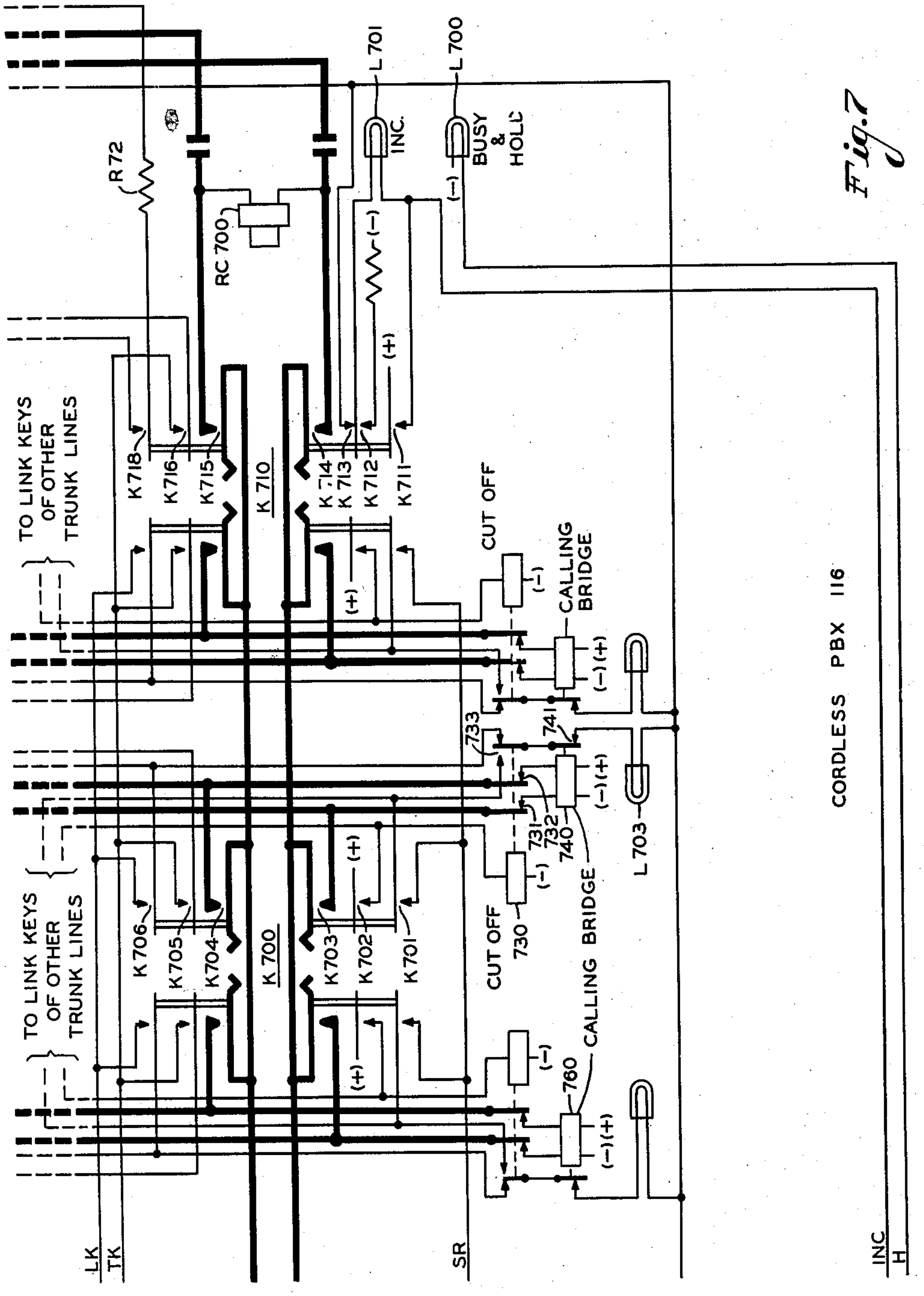
Figure 8:
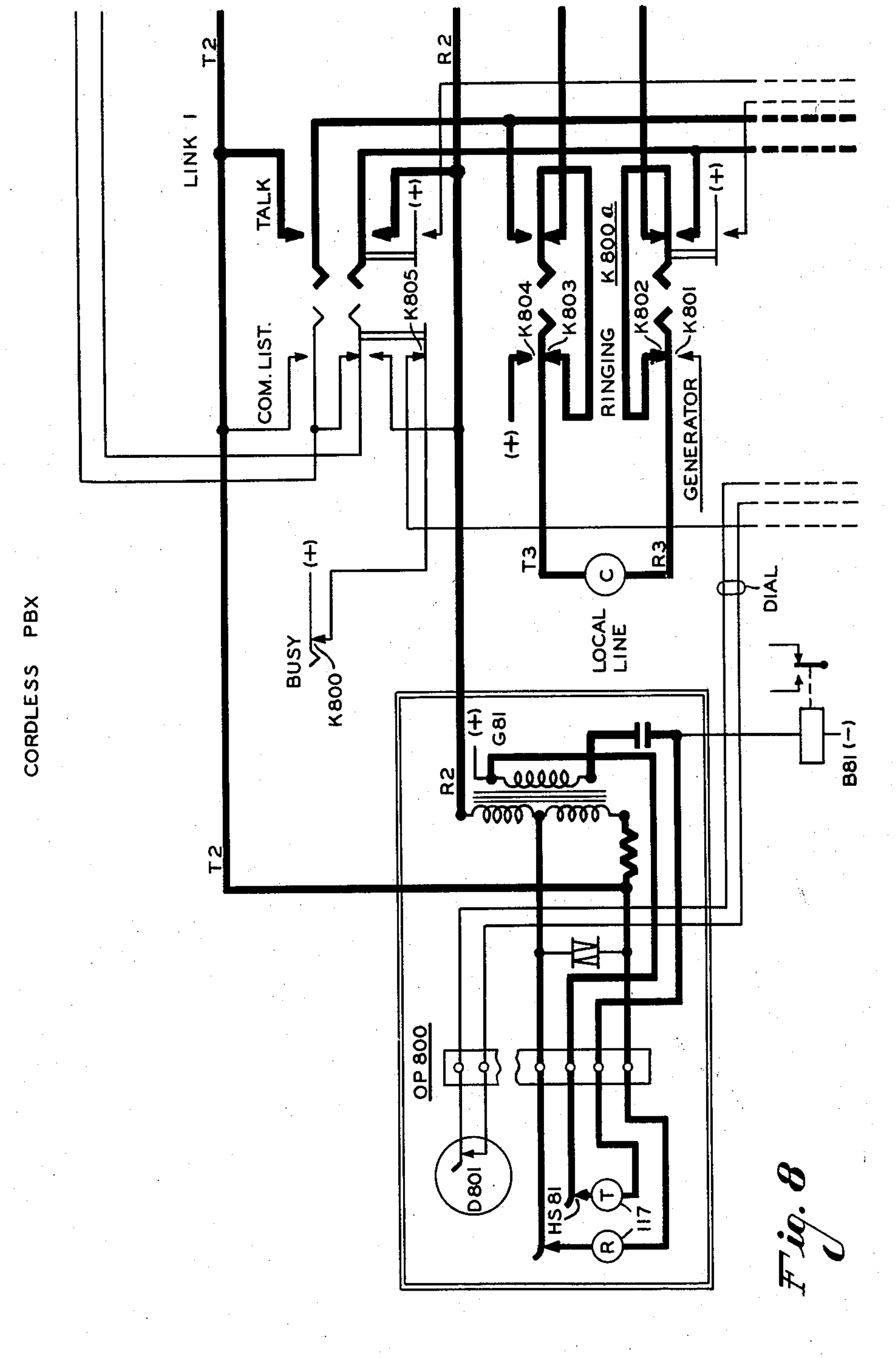
Figure 9:
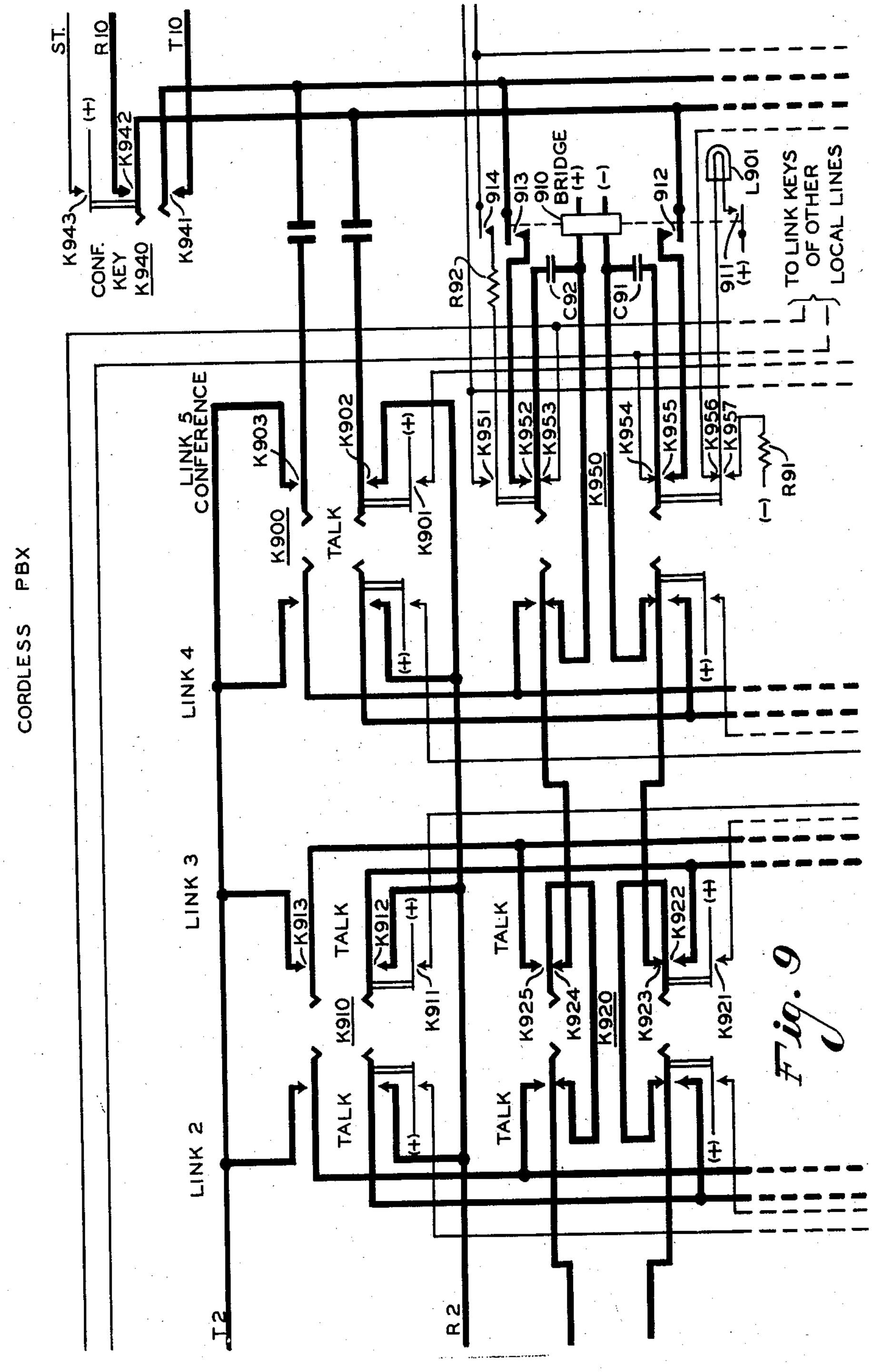
Figure 10:
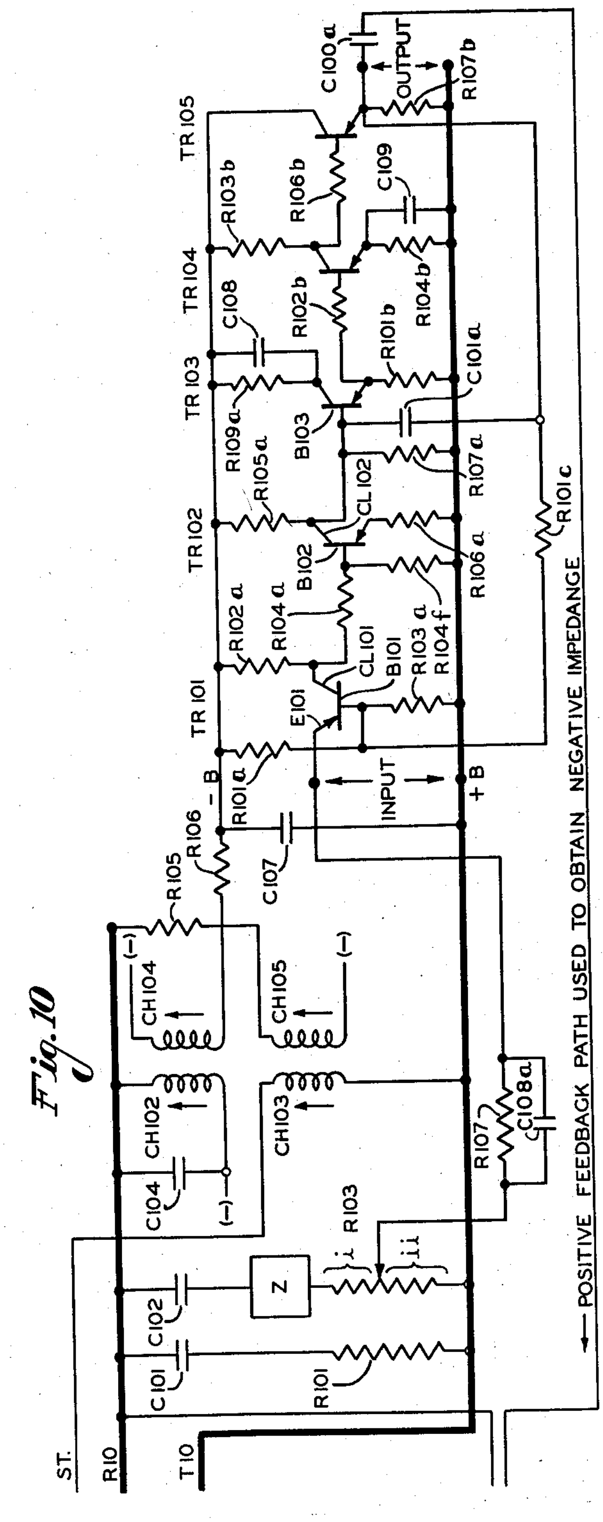
Figure 12:
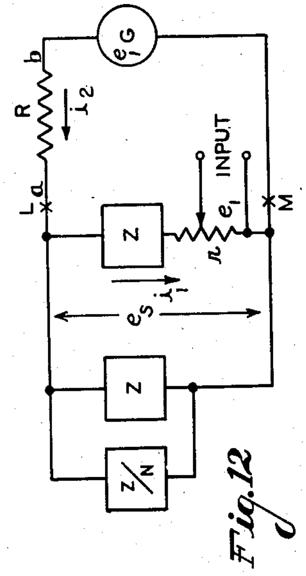
Figure 13:
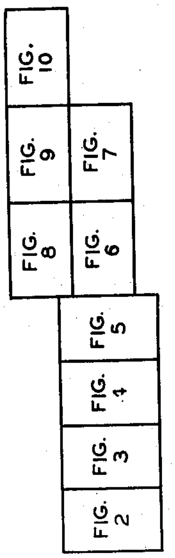
Figure 11:
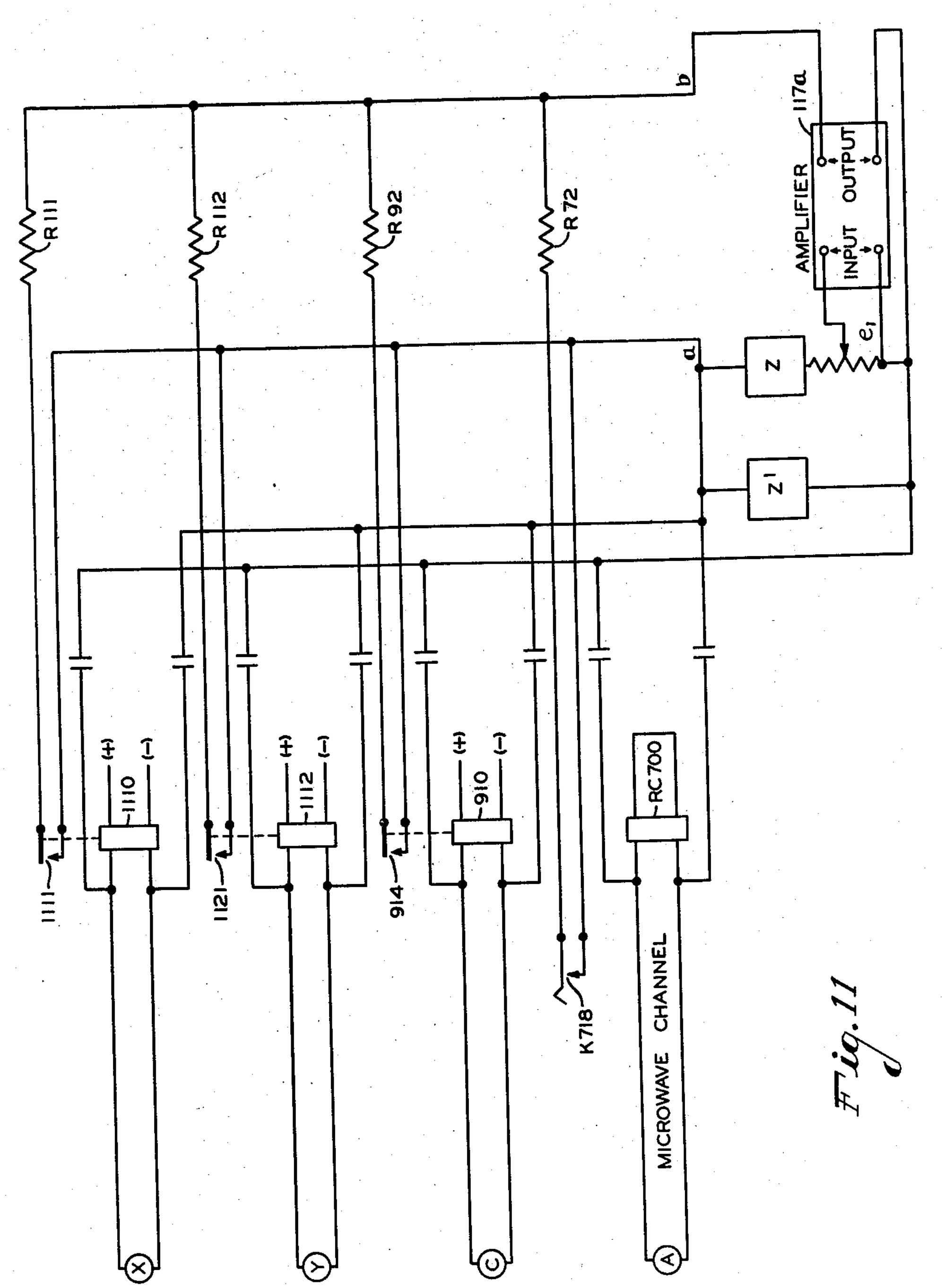

Figs. 7, 8 and 9 show the remainder of a cordless P. B. X;

Fig. 10 shows an all-transistor amplifier designed to provide a negative impedance characteristic to the conference call circuit;

Fig. 11 shows a skeletonized conference call circuit taken from the detailed circuit shown in Figs. 2–10;

Fig. 12 shows an electrical equivalent of the conference call circuit with all circuit elements lumped; and Fig. 13 shows the manner in which Figs. 2–10 should be arranged to provide a complete and operative circuit.

In the drawings, the office potential is shown by means of simple plus and minus signs. As is the case in most telephone systems, the positive terminal is described as connected with ground; therefore, the terms "ground (+)" and "(−) battery" have been used throughout the specification. It should be understood that either this or any other suitable system may be used.

BRIEF DESCRIPTION

Figure 1:
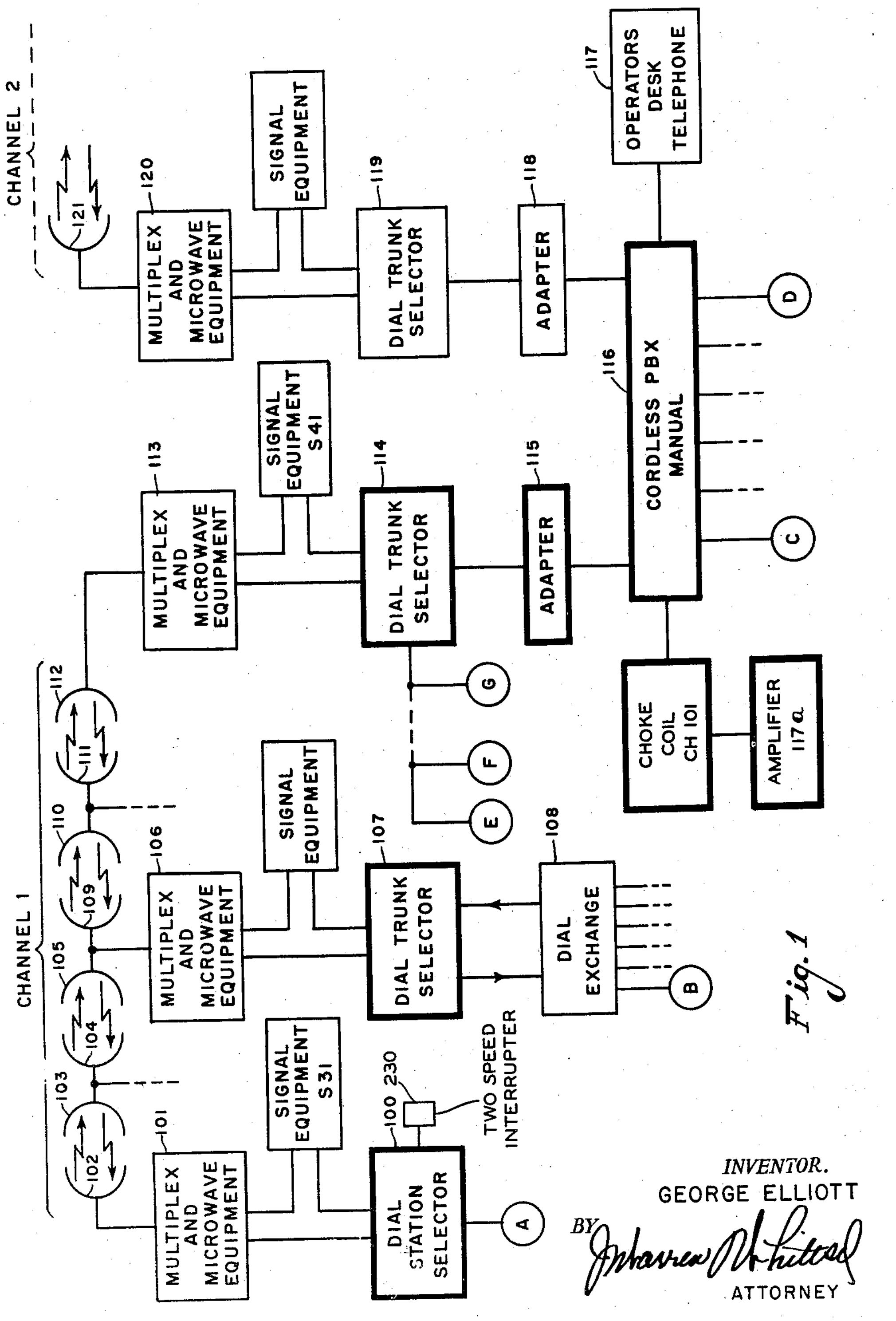
Fig. 1 shows a block diagram of how the system may be connected together, the heavily inked boxes being an indication of those portions of the system which are shown in detail in the accompanying circuit drawings.

Fig. 1 shows generally a microwave radio link telephone system using the subject invention. In this drawing a number of subscribers are connected into a system using a plurality of radio channels, wherein each channel provides one "party line." For example, channel 1 serves subscribers A–G. An electromechanical switch is provided at each terminal serving one channel so that any subscriber may dial to signal any other subscriber on that channel. In the case where there are a plurality of channels terminating, such as at cordless P. B. X 116, for example, a switch is provided for each channel.

Specifically, each radio channel is shown by a plurality of antennas representing microwave terminals or repeater stations. Each microwave terminal may include multiplexing equipment such as modulator M31 and demodulator D31 while any suitable four wire terminating set, such as hybrid circuit H31, may be utilized to interconnect conductors T and R with modulator M31 and demodulator D31. Special radio link equipment M32 may be provided to transmit and receive radiant energy. For example, signals to and from station A are transmitted and received over antenna 102. The next microwave repeater sends and receives signals at antenna 103 to and from antenna 102 while repeating these signals from antenna 104 to antenna 105. In a similar manner, the next repeater is served by antennas 105 and 109, etc. The equipment shown to the left of cordless P. B. X 116 comprises one "party line" channel while the equipment shown to the right of the cordless P. B. X comprises another "party line" channel. Each of these repeater or terminal stations is provided with suitable microwave, multiplex, signal and switching equipment. For example, if subscriber A should call another subscriber on his channel, signal equipment S31 responds to subscriber A transmitted digit pulses to step simultaneously dial selectors 107, 114 and corresponding switches at each other repeater station on the same channel. One selector encounters suitable markings indicating that the called subscriber is at that repeater station; therefore a suitable ringing or other circuit, in the case of subscriber E, is completed to signal the called subscriber, or, in the case of subscriber B, additional switching may be completed in dial exchange 108 responsive to further digit pulses transmitted from substation A. In the case of calls to subscriber C, an operator at cordless P. B. X 116 completes the call. The selectors which did not encounter a marking indicating that the called party is at its particular microwave repeater or terminal remain in their operated position until the end of the call; meanwhile, signal equipment at all other stations is locked so that no other subscriber may dial into a busy channel.

Selectors 100, 107, 114 and 119 are similar. Switch 100 can only signal a subscriber station while switches 107, 114 and 119 may transmit any one of various signals depending on the particular equipment being called in. In each case the talking conductors are equivalent to "party line" connections and are not switched.

Each of the dial station selectors is provided with a two speed self-interrupted relay, such as relay 230, for example. This relay is connected in series with a resistor and a capacitor. At one time relay 230 operates at a relatively high rate of speed to provide an interrupted busy tone. At another time the resistor is shunted to cause the relay to operate at a relatively low rate of speed to provide an interrupted ringing current. The rate of speed of the relay changes responsive to the operation of dial station selector 100 to seize an idle line.

Conference calls are completed by the intervention of an operator who is served by telephone 117. In the case of calls of this type, an unbalanced conference amplifier 117a is connected by choke coil CH101 to a balanced conference call circuit in cordless P. B. X 116. This amplifier is adapted to provide a negative impedance characteristic which is used automatically to off-set the added impedance of each telephone as it is added to the conference call circuit.

DETAILED DESCRIPTION

Figure 2:
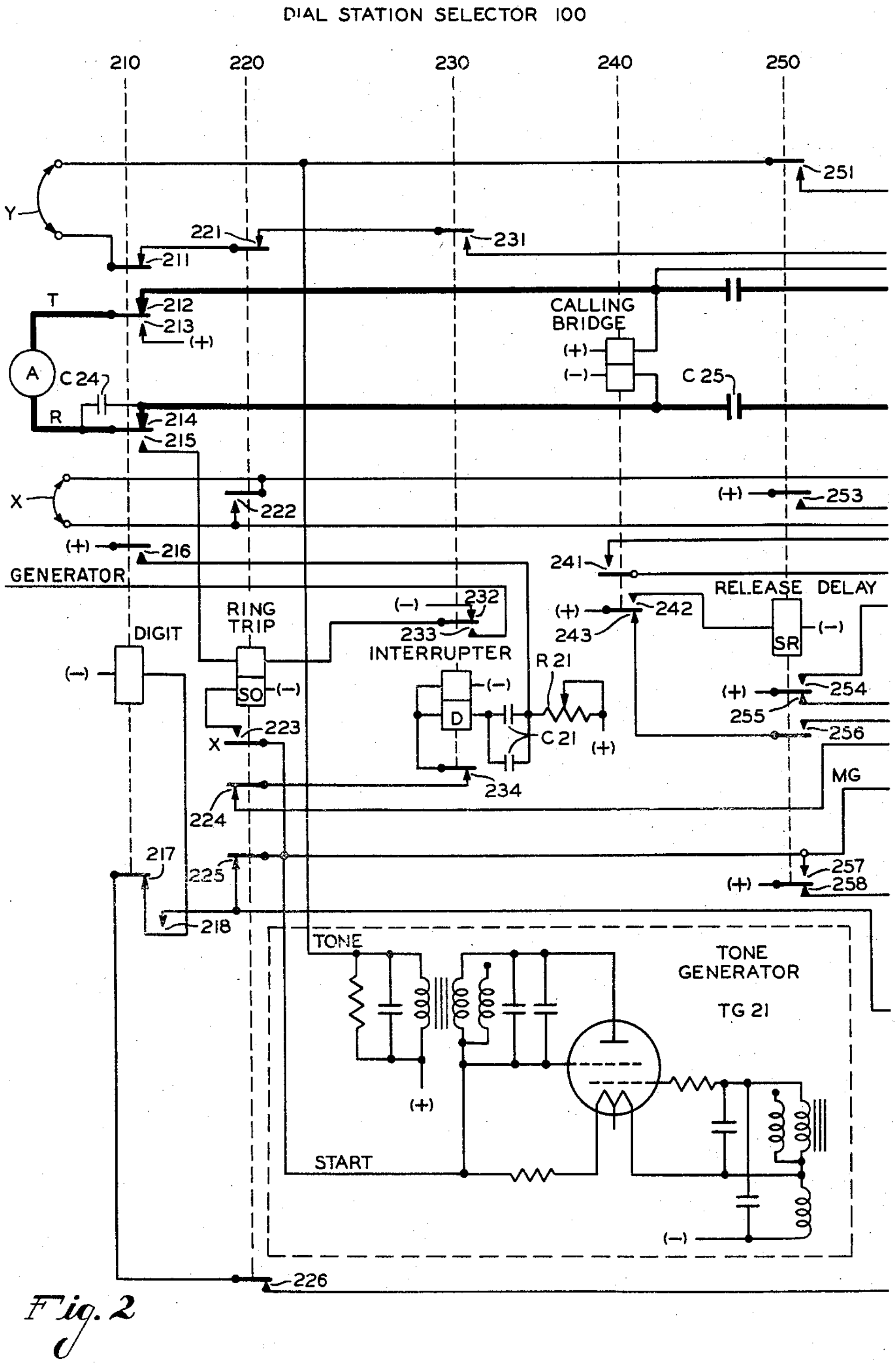
Figs. 2 and 3 show a dial station selector switch.
Figure 3:
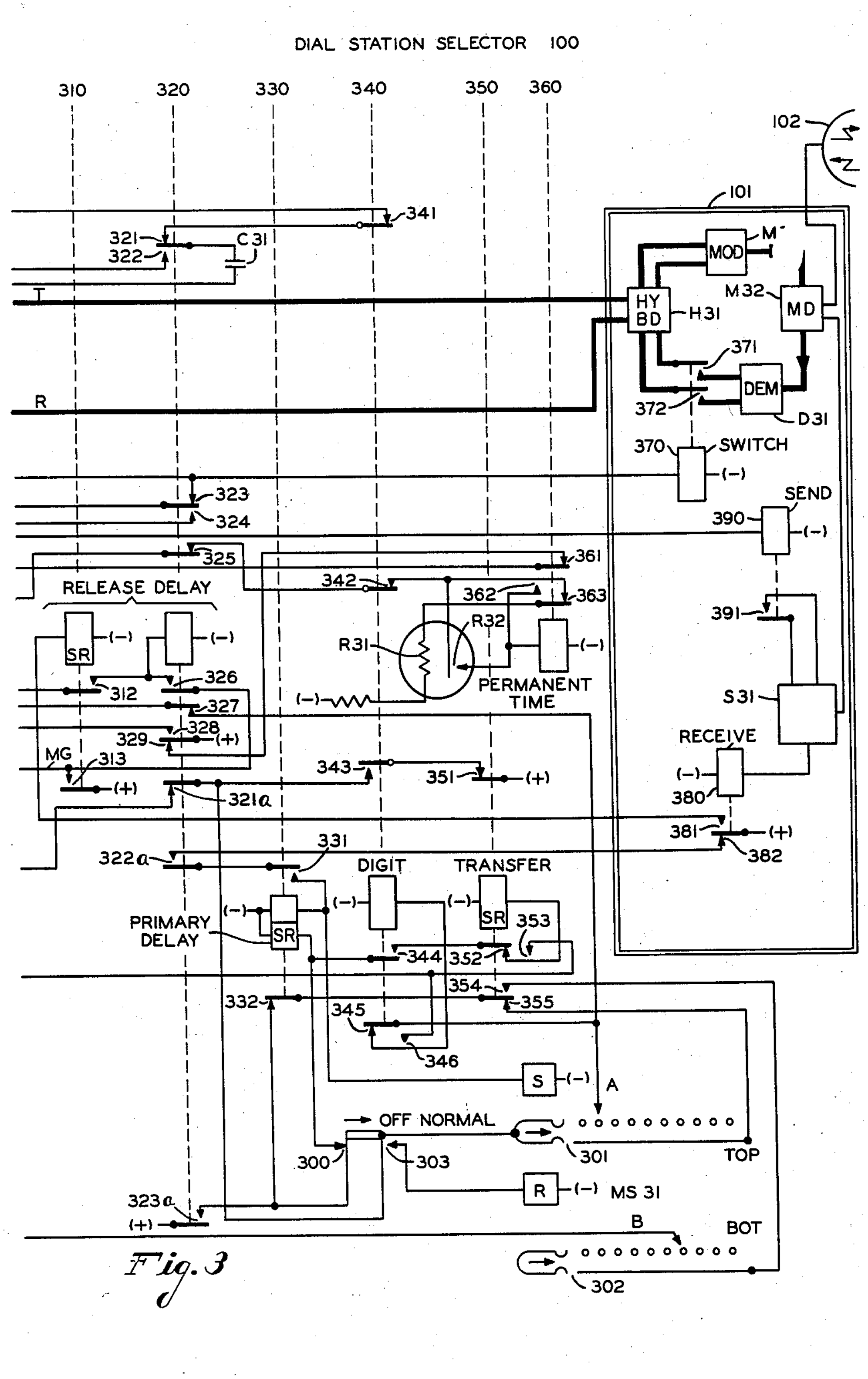
Figure 4:
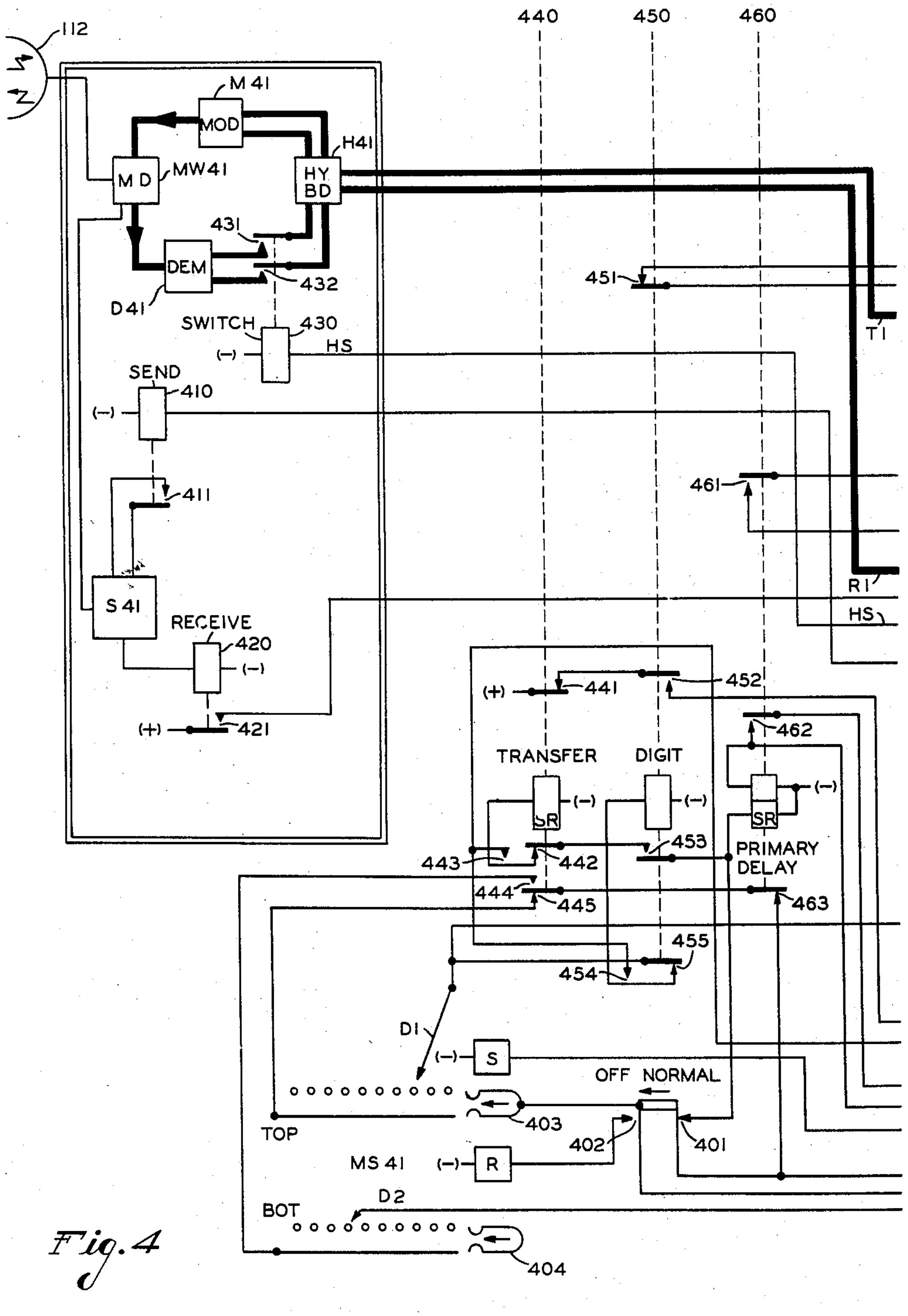
Figs. 4 and 5 show a dial trunk selector switch.
Figure 5:
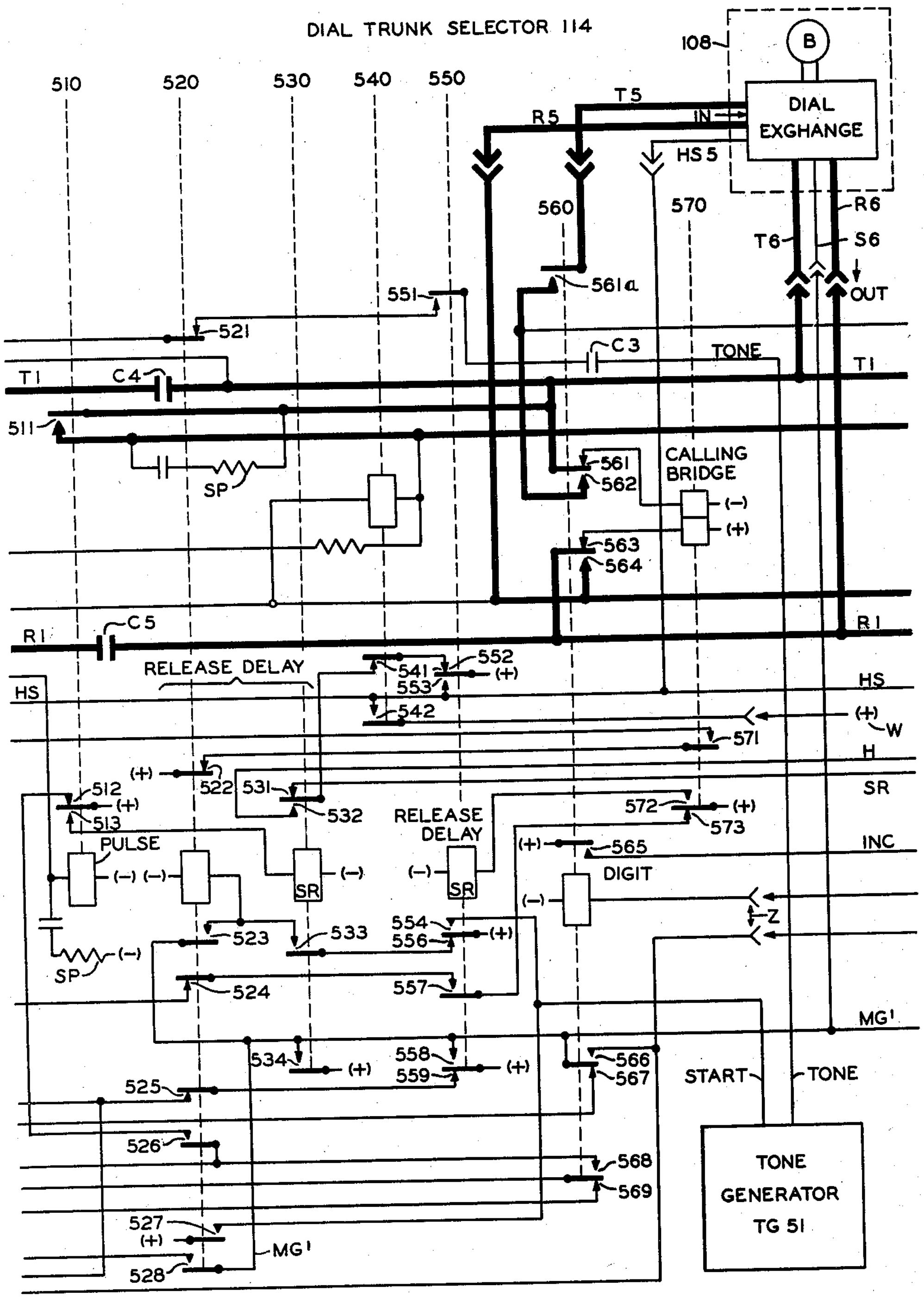

Figs. 2–10 show details of circuits shown in Fig. 1 by heavily inked boxes. For example, dial selector 100 is shown in Figs. 2 and 3, while trunk selector 114 is shown in Figs. 4 and 5. Trunk selector 107 is the same as that shown in Figs. 4 and 5 except that the dotted rectangle marked "Dial Exchange" 108 is used and adaptor 115 is omitted.

*Station selector 100*

The circuit of Figs. 2 and 3 shows a two-digit station selector for a radio or carrier terminal. Briefly, each selector is arranged with a single pair of talking conductors to which its associated station is connected. There is no switching between various tip and ring conductors. The selecting motion of the switch determines only which one of the possible called parties is to be signaled.

*Outgoing call*

*Seizure.*—The first call to be described is one from subscriber A to a subscriber in a distant terminal such as subscriber B or C (Fig. 1), for example. Subscriber A initiates a call by removing his receiver thereby completing a loop across tip and ring conductors T and R (Fig. 2), in a conventional manner. Responsive thereto, calling bridge relay 240 operates over the circuit from ground (+), through the upper winding of relay 240, rest contacts 212, conductor T, telephone A, rest contacts 214, and through the lower winding of calling bridge relay 240 to (−) battery. Calling bridge relay 240 operates. This relay is used to furnish talking battery, to detect and signal the presence of a call and to respond to and repeat digit pulses. Responsive to the operation of calling bridge relay 240, contacts 241 close to operate send relay 390 over the following circuit: (−) battery through the winding of send relay 390, operated pulsing contacts 241, resting contacts 361 and 329 to ground (+). The purpose of this relay is to signal the distant terminal by way of any suitable signal equipment S31. More particularly, relay 390 is used at this time to close contacts 391 thereby transmitting a seizure signal. Returning to the operation of calling bridge relay 240, contacts 242 close to complete an obvious circuit for release delay relay 250. The primary purpose of this relay is to furnish master ground at contacts 257 and thereby hold the circuit operated when calling bridge relay 240 releases during dial pulsing.

Release delay relay 250 operates. It closes its contacts 257 to connect ground (+) to master ground conductor MG. This conductor is called "master ground" because it furnishes the ground marking by means of which most relays in selector 100 are held in an operated position. This ground also starts tone generator TG21 via the "start" conductor. Dial tone generator TG21 produces a tone current which is now connected through operated contacts 251, rest contacts 341, 321, capacitor C31, contacts 212, subscriber A's telephone, rest contacts 214, and the lower winding of calling bridge relay 240 to (−) battery. Contacts 253 close to complete a circuit via contacts 323 to operate switch relay 370. The purpose of this relay is to close contacts 371 and 372 thereby connecting the output of demodulator D31 to the hybrid coil and balancing network H31. Normally, these contacts are open when the talking circuit is not in use, thereby preventing any undue howling or singing in the carrier circuit.

*Permanent timing.*—Contacts 254 close to prepare the permanent timing device which releases the distant equipment if digit pulses are not transmitted promptly. More particularly, ground (+) is extended through contacts 254, 325, 342, 363 and resistor R31 to (−) battery. Resistor R31 heats over a given time period to a sufficient temperature to close contacts R32 to complete a circuit for permanent time relay 360. This circuit extends from (−) battery through the winding of relay 360, operated contacts R32, rest contacts 342, 325 and 254 to ground (+). When relay 360 operates, it locks over a circuit including contacts 362. Contacts 361 then open thereby breaking the holding circuit for send relay 390. This circuit formerly included contacts 241, 361 and 329. Release of send relay 390 terminates the seizure signal to the distant microwave terminal, thereby releasing it.

Assuming, however, that digit pulses are received before the expiration of the predetermined time period required for resistor R31 to heat sufficiently to close contacts R32, contacts 342 open in the manner to be explained below in the section entitled "Dialing." This, in turn, prevents the operation of permanent time relay 360.

*Dialing.*—The circuit is now prepared for the receipt of digit pulses; therefore, nothing further happens until calling subscriber A transmits a suitable number of digit pulses. These pulses are in the form usually called "open loop pulses." That is, a dial at subscribers A's telephone station may be operated in a conventional manner responsive to which appropriate springs open and close the talking loop across conductors T and R a suitable number of times to transmit the proper digit pulses that are representative of the called subscriber's number. Since the loop across conductors T and R is broken on each digit pulse to be transmitted by the dial, the circuit for calling bridge relay 240 is likewise broken; therefore this relay releases and reoperates to repeat each digit pulse.

The repeated pulse is transmitted each time that calling bridge relay 240 releases to open contacts 241. That is, the holding circuit for send relay 390 includes contacts 241, 361 and 329. Each time that contacts 241 open, send relay 390 releases to open contacts 391. Signal equipment S31 then transmits these signal pulses by any suitable means to the distant microwave terminal. For example, dial trunk selector 114 may utilize the digits in the manner explained below in the section "Incoming call" under "Dial trunk selector 114." Contacts 242 also open the circuit to relay 250 responsive to the release of calling bridge relay 240. However, release delay relay 250 does not fall due to its slow release characteristics.

Contacts 243 close to operate digit relay 340 over the following circuit: ground (+), rest contacts 243 on calling bridge relay 240, operated contacts 256 on release delay relay 250, rest contacts 327 and 345 to (−) battery through the winding of digit relay 340. The primary reasons for operating this relay at this time is to terminate the permanent time measurement so that relay 360 may not operate to break the connection and to terminate dial tone. In greater detail, it may be recalled that permanent time relay 360 operates only after resistor R31 has had time to heat over the circuit including contacts 363, 342, 325 and 254. Now, this circuit is broken by digit relay 340 at contacts 342. Also, contacts 341 open to break the path for transmitting dial tone to the calling subscriber. Once operated, digit relay 340 locks for the duration of the outgoing call over the path from (−) battery through the winding of relay 340, contacts 346, 225, and master ground conductor MG, to ground (+) at contacts 257.

Conversation follows by way of the tip and ring conductors T and R shown near the top of the drawing by means of heavily inked lines.

*Release.*—Either party may hang up first at the termination of the call. It is assumed that subscriber A hangs up first to break the loop extending to calling bridge relay 240. It releases. Contacts 242 open to restore release delay relay 250. Contacts 241 open to release send relay 390, thus releasing the channel. Contacts 257 open to remove the ground (+) marking from master ground conductor MG. Any relays then operated are released.

If the called subscriber is the first to hang up, there is no effect at the calling station, and the channel is held busy until the calling subscriber releases.

*Incoming call*

*Seizure.*—This call is one which is incoming to station A from any other station in the microwave system. Referring to Fig. 1, the calling station may be station C, for example, and the call may originate as explained below in the section "Outgoing call" under "Dial trunk selector 114." Signal equipment S41 associated therewith is operated to transmit a seizure signal over the microwave channel to antenna 102. At this point, signal equipment S31 responds to cause the operation of receive relay 380. The purpose for this relay is to receive incoming signals and to repeat them to control dial station selector 100. When receive relay 380 operates, contacts 381 close while contacts 382 open.

Responsive thereto, an obvious circuit is completed from ground (+) through operated contacts 381 to operate release delay relay 310. This relay furnishes master ground to hold selector 100 and its associated relays until release of the circuit after the call is complete. Contacts 313 close to apply this ground (+) marking to master ground conductor MG. Contacts 312 close to operate a slave release delay relay 320, the circuit being from ground (+) through contacts 255 and 312 to (−) battery via the winding of relay 320. Relay 320 operates and locks to master ground via contacts 326. This relay is a slave to relay 310. Contacts 321 open to forestall any possible connection of dial tone at this time. Contacts 323 open to prevent any possible operation of switch relay 370 until subscriber A answers and the hybrid circuit H31 is properly terminated. This prevents the circuit from singing or howling. Contacts 324 prepare a path for switch relay 370 when the called subscriber answers. Contacts 325 open to prevent any possible operation of permanent time relay 360. Contacts 327 open to prevent untimely operation of digit relay 340.

Contacts 321*a* open to prevent any premature release of minor switch MS31. Contacts 323*a* close to operate primary delay relay 330 over the circuit including contacts 323*a*, off-normal contacts 300, and the lower winding of primary delay relay 330, to (−) battery. It operates and prepares a locking path for itself by way of contacts 331 and 322*a*. However, this path is not completed because contacts 382 are then open.

Contacts 328 close to initiate operation of interrupter relay 230. The circuit for this extends from (−) battery through the upper winding of relay 230, contacts 234, 224 and 328 to ground (+).

*Two speed interrupter relay.*—Interrupter relay 230 begins to operate, release and reoperate cyclically to interrupt the supply of tone to provide busy tone to any stations which may attempt to originate a call at this time. Relay 230 operates in the following manner. Originally, capacitor C21 is charged over the circuit including the upper and lower windings of relay 230 in parallel, capacitor C21 and resistor R21. Completion of the above traced circuit from ground (+) on contacts 328 through the upper winding of relay 230 causes capacitor C21 to discharge and differentially energize relay 230 to prevent its operation. After the discharging current through capacitor C21 ends, relay 230 operates over its upper winding from the ground (+) at contacts 328. This in turn opens contacts 234. Capacitor C21 is discharged at this time; therefore, a charging current begins to flow from (−) battery through the upper and lower windings of relay 230 in series—this time the direction of current flow is in a direction which is in series aiding so that relay 230 remains energized over a brief period of time. When the capacitor is fully charged, the charging current stops and relay 230 releases to close contacts 234 which starts the process all over again. Interrupter relay 230 continues to operate and release periodically.

At this time it might be well to digress briefly to explain the operation of interrupter relay 230 during ringing since this is a dual function relay and since the contrast between the two functions is understood best if explained together. As will be pointed out presently, various digit pulses will be received and responsive thereto a digit relay such as relay 210 will operate at one terminal station depending upon the position of strapping B. When this digit relay operates, it closes contacts 216 thereby shunting resistor R21 by connecting the right-hand plates of capacitors C21 to solid ground (+) instead of to resistive ground (+). This changes the speed at which interrupter relay 230 is operating, i. e., after operation of relay 210, the speed of interruptions are slower to provide ringing current, previously they were fast to provide busy tone. Since the operated digit relay is at one terminal station only, the other stations furnish busy tone to their subscribers with interruptions at a higher rate of speed.

The circuit is now in condition to receive the first digit pulse train. Therefore, nothing further happens until it is received. The purpose of relay 330 is to mark the end of each incoming digit pulse train.

*First digit.*—The digit pulses which are received over antenna 102 from the distant microwave terminal are connected through multiplex and microwave equipment 101 to signal equipment S31. These digit pulses are then operative to cause repeated release and energization of receive relay 380. Responsive to each digit pulse, relay 380 releases to open contacts 381 while closing contacts 382. Release delay relay 310 is deenergized each time that contacts 381 open; however, it does not release but continues to hold due to its slow release characteristics.

A circuit is completed to cause minor switch MS31 to take one step each time that contacts 382 close responsive to a digit pulse. The stepping circuit may be traced from ground (+) through contacts 382, 322*a*, 331 and the winding of step magnet S to (−) battery and in parallel therewith through the upper winding of relay 330 to (−) battery. When magnet S operates, it drives brushes 301 and 302 into their associated bank of contacts. Simultaneously therewith, off-normal contacts 300 open while contacts 303 close. Primary delay relay 330 has its original operating path broken at off-normal contacts 300; however, it does not release at this time since it is further energized by way of its upper winding and contacts 331, 322*a* and 382. As each digit pulse terminates, receive relay 380 reoperates to close contacts 381 thereby reenergizing release delay relay 310. Simultaneously therewith, contacts 382 open to deenergize both primary delay relay 330 and magnet S; however, relay 330 remains operated due to its slow release characteristics.

The minor switch is operated one step for each digit pulse to be received. At the termination of the last pulse in the first pulse train, contacts 382 remain open for a period which is longer than the slow release period of primary delay relay 330; therefore, it releases to close its contacts 332 and open its contacts 331.

The next function depends upon the particular step to which the minor switch has been directed. For example, assuming that the first pulse train comprised two digit pulses, brush 301 is left standing on the second terminal to which the wiring A is connected. Since wiring A is individual to ten or less stations including the circuit of station A—assumed to have the directory number "27"—a circuit is completed for operating digit relay 340. This circuit may be traced from (−) battery through the winding of digit relay 340, rest contacts 345, wiring A, brush 301, contacts 355, 332 and 323*a* to ground (+). If the minor switch had been directed to some other terminal, a different group of digit relays similar to relay 340 would have been operated. Therefore, it is seen that the purpose of operating this relay at this time is to identify the first digit in the called subscriber's directory number. Contacts 346 close to lock digit relay 340 in an operated condition dependent upon the maintenance of master ground from contacts 313 through contacts 225 and 346. Contacts 343 close to release minor switch MS31. The release circuit may be traced from (−) battery through the winding of release magnet R, operated off-normal contacts 303, operated contacts 343, and rest contacts 351 to ground (+). Minor switch MS31 returns to normal thereby opening off-normal contacts 303 while closing off-normal contacts 300. Transfer relay 350 now operates over the circuit from (−) battery through contacts 352, 344, 300 and 323*a* to ground (+). It locks through contacts 353, 225 and 313. Its purpose is to prepare the circuit to register the second digit. Primary delay relay 330 reoperates over the circuit from (−) battery through its lower winding, contacts 300 and 323*a* to ground (+).

*Second digit.*—The circuit is now prepared to receive the second train of digit impulses. Again, receive relay 380 releases responsive to each impulse that is received over the microwave channel. As in the case of the first digit, a circuit is completed through contacts 382, 322*a* and 331 to operate step magnet S and energize relay 330 in parallel therewith. Responsive to the first step off-normal, contacts 300 open to break the original energizing path for primary delay relay 330; however, again, it continues to hold throughout pulsing due to its slow release characteristics and the circuit through its upper winding and contacts 331, 322*a* and 382. The minor switch is stepped out a number of times depending upon the number of pulses in the second pulse train.

Assuming that seven digit pulses are received, wiper 302 is directed to the seventh terminal in the bottom level which is individual to ten or less stations including subscriber A. This time both digit relay 340 and transfer relay 350 are operated and locked to master ground as a result of the first digit; therefore, the circuit to digit relay 210 is completed through contacts 354 instead of 355 as was the case after the first digit was received. Hence, a circuit is now completed from ground (+) through contacts 323*a*, 332, 354, brush 302, wiring B, contacts 226, 217, and through the winding of digit relay 210 to (−) battery. It operates and locks to master ground at contacts 218, 225, and conductor MG to ground (+) on contacts 313. Contacts 216 close to change the speed of interrupter relay 230 by shunting resistor R21. The purpose of relay 210 is to register the digit "7." If some digit other than "7" had been received, a relay corresponding to relay 210 at a different station would have been operated. Since both digits in the directory number of subscriber A have been received, the circuit is prep?red to transmit ringing current to signal the called subscriber.

*Ringing.*—Ringing current is transmitted from a ringing generator (not shown) through the "generator" conductor contacts 233, the upper winding of ring trip relay 220, contacts 215, conductor R, subscriber station A, conductor T, and contacts 213 to ground (+). Since interrupter relay 230 is alternately operating and releasing depending upon the characteristics of capacitor C21, ringing current is interrupted repeatedly at contacts 233. It might also be noted that operation of digit relay contacts 216 has shunted resistor R21 to change the pulsing rate of relay 230 from the busy tone speed to the ringing speed. During quiescent periods, (−) battery is applied at contacts 232. Ring back tone is connected from the generator lead through contacts 233, the upper winding of ring trip relay 220, contacts 215, capacitors C24 and C25, ring conductor R, hybrid circuit and balancing network H31, modulator M31 and out over antenna 102 to the calling subscriber.

*Answer.*—Ringing continues until the called party responds by removing his receiver thereby completing a direct current loop over a circuit which may be traced from (−) battery through contacts 232, the upper winding of ring trip relay 220, contacts 215, conductor R, subscriber substation A, conductor T, and contacts 213 to ground (+). Ring trip relay 220 operates its preliminary or "X" contacts 223 and thereby energizes its lower winding, the circuit being from (—) battery through the lower winding of ring trip relay 220, contacts 223, and master ground conductor MG, to master ground (+) applied through operated contacts 313. With this, ring trip relay 220 receives enough current to operate fully. Contacts 221 open to break still another point in the dial tone circuit. Contacts 222 close part of a circuit for switch relay 370 over the following circuit: (—) battery through the winding of relay 370, contacts 222, 324 and 253 to ground (+). (Operation of relay 250 will be described presently.) Contacts 224 open to stop the interrupted operation of relay 230. Contacts 225 open to release digit relays 210 and 340 and transfer relay 350. Contacts 226 open to prevent any possible reoperation of relay 210. Digit relay 210 releases and opens contacts 213 and 215. Contacts 212 and 214 close, thus completing a circuit for energizing calling bridge relay 240. This circuit may be traced from ground (+) through the upper winding of calling bridge relay 240, contacts 212, tip conductor T, subscriber station A, ring conductor R, contact 214 and the lower winding of calling bridge relay 240 to (—) battery.

When relay 240 operates, contacts 241 close; however, they have no effect at this time since the operate circuit for send relay 390 is held open by release delay relay 320 at contacts 329. This arrangement prevents inadvertent operation of send relay 390 when the circuit is in use on an incoming call.

Release delay relay 253 operates over an obvious circuit including contacts 242 to apply an alternate master ground at contacts 257, and to complete the above noted circuit to switch relay 370 (i. e., ground (+), contacts 253, 323 and the winding of relay 370, to (—) battery). Contacts 371 and 372 connect the demodulator to hybrid circuit H31.

Conversation follows. At the termination of the conversation, release is as described above in the section entitled "Release."

If subscriber A is not at the called substation and if the first digit to be dialed is not one marked in the banks of minor switch MS31 by wiring A, a relay corresponding to relay 340 does not operate in subscriber A's dial station selector circuit. In this case, contacts 343 never close, thus the minor switch does not return to normal after the first digit. Rather, the minor switch remains operated throughout the entire conversation. At the end of conversation and when all relays are normal, the minor switch is returned to normal because a circuit is then closed from ground (+) through contacts 258, **321*a* and 303 to release magnet R and (—) battery. When the switch returns to normal, off-normal contacts 300 close and 303** open thus leaving the switch ready for the next call.

On the other hand, assuming that a subscriber is called (other than subscriber A) so that a wiring "A" is on the minor switch bank contact that is reached responsive to the first digit, minor switch MS31 operates in a manner described above in the section entitled "Incoming call." Digit relay 340 releases and the switch drops back to normal. When the switch is directed by the second digit, it stops on a bank which is not marked by wiring "B." Hence, a relay corresponding to digit relay 210 never operates in this particular selector switch circuit. Again, the minor switch remains in its extended position until the termination of the call at which time it releases over the circuit including contacts 258, **321*a* and 303**.

*Listen-in service and multiple signaling for microwave subscribers*

Two types of service may be provided. In the first case, a subscriber who is not a party to a conversation in progress may be permitted to listen-in to determine whether there is conversation on the line. In the second case, the subscriber is not permitted to listen-in on the conversation but he receives busy tone indicating that the channel is in use.

In the first case, wiring Y (upper left-hand corner of Fig. 2) is omitted and wiring X (center of left-hand edge of Fig. 2) is used. In this case subscriber A can listen in on a conversation then in progress. That is, when subscriber A removes his receiver and relays 240 and 250 operate, as described above in the section on outgoing calls, a circuit is completed for energizing switch relay 370. This circuit extends from (—) battery through the winding of relay 370, wiring X, contacts 324 and 253 to ground (+). It might be noted that relay 320 was operated responsive to the operation of receive relay 380 when the call was originally set up. When switch relay 370 operates, contacts 371 and 372 close thereby connecting the demodulator D31 to the hybrid circuit H31 so that the subscriber A may listen to the conversation.

As will be explained below in the section entitled "Conference call," this listen-in feature may be used to provide for simultaneous service to more than one subscriber on the microwave channel. That is, if wiring X is used and wiring Y is omitted, a first subscriber is called and instructed to wait for a conference call. The calling party or operator disconnects and restores the dial station selectors. Following this, the calling subscriber or operator dials to signal the next subscriber to be in on the conference call. In this manner any number of subscribers may be signaled for a simultaneous or conference call.

It might be noted that switch relay 370 originally operated over the circuit from (—) battery through the winding of relay 370, contacts 222, 324 and 253. The called subscriber answers and relays 240 and 250 operate. Relay 320 is now locked operated over the path including (—) battery extended through the winding of relay 320, contacts 326 and 257 to ground (+). Switch relay 370 does not thereafter release until called subscriber A hangs up. Hence, subscriber A remains in telephonic communication with the microwave channel while the conference call is being set up.

In the second case where listen-in service is not provided, wiring Y is used and wiring X is omitted. When subscriber A removes his receiver and the channel is in use, calling bridge relay 240 and release delay relay 250 operate in the manner described above in the section relating to the outgoing call. However, send relay 390 may not operate because contacts 329 are open; therefore, subscriber A cannot make a call. Busy tone is extended to inform him of this fact from the tone generator TG21 over the tone conductor, wiring Y, contacts 211, 221, 231, 322, capacitor C31, contacts 212, subscriber A's telephone, contacts 214 and the lower winding of calling bridge relay 240 to (—) battery. Incidentally, it might be noted again that relay 320 is operated as a slave of relay 310 which in turn is operated by receive relay 380 because the channel is busy; therefore, interrupter relay 230 is alternately operating and releasing at a relatively high rate of speed due to the fact that contacts 328 are closed.

*Incoming call to dial trunk selector 114*

The next call to be described is one that is incoming to dial trunk selector 114. For example, referring to Fig. 1, this call could be from subscriber A to subscriber C by way of channel 1 and its associated equipment including dial trunk selector 114.

*Seizure.*—Referring to Fig. 4, the presence of an incoming call is signaled when receive relay 420 operates responsive to a suitable signal received by signal equipment S41 over antenna 112 from a calling station on channel 1. Receive relay 420 operates and closes its contacts 421. Responsive thereto, pulse relay 510 operates over an obvious circuit. The purpose of this relay is to receive and repeat signal and supervisory currents from the distant office.

Responsive to the operation of pulse relay 510, contacts 511 close to prepare a circuit for transmitting ring back tone when appropirate.

Contacts 513 close to operate release delay relay 530. The primary purpose of this relay is to furnish master ground for holding the circuit operated when pulse relay 510 releases during digit pulsing. Contacts 532 close to mark channel 1 busy to outgoing calls from the cordless P. B. X 116. This circuit may be traced from ground (+) applied through contacts 552, 541, 532, conductor H and busy lamp L700 to (−) battery. Lamp L700 lights as an indication that channel 1 is in operation. Contacts 534 close to apply a ground (+) marking to master ground conductor MG′. Since this ground marking is used to hold most relays in the trunk selector, it is called "master ground" hereinafter, and the conductor to which it connects is labeled MG′. Contacts 533 close to operate release delay slave relay 520. The circuit for operating relay 520 extends from ground (+) through contacts 556 and 533 to (−) battery by way of the winding of relay 520.

Release delay relay 520 operates. Its contacts 521 open to forestall transmission of dial tone. Contacts 522 open to prevent operation of send relay 410 if the called party is last to release. Contacts 523 close to lock relay 520 in an operated condition depending upon the maintenance of master ground at contacts 534. Contacts 525 open one release circuit of the minor switch MS41. Contacts 526 close to prepare a holding circuit which is completed during pulsing for primary delay relay 460. Contacts 527 close to start tone generator TG51. This tone generator is any suitable device designed to provide dial tone. For example, it may be the same as tone generator TG21. Contacts 528 close to operate primary delay relay 460. The circuit for this function extends from (−) battery through the lower winding of primary delay relay 460, resting off-normal contacts 401, operated contacts 528, to master ground conductor MG′ and ground (+) applied through operated contacts 534.

Primary delay relay 460 operates. The purpose of this relay is to mark the end of each digit pulse train as it is received. Contacts 461 close but have no effect at this time. Contacts 462 close further to prepare part of the circuit over which primary delay relay 460 is held throughout pulsing. Contacts 463 open to prevent a ground (+) marking from being extended over the upper bank of minor switch MS41 until the end of the completed digit pulse train. The circuit is now ready to receive the digit pulses; therefore, nothing further happens at this time.

*Dial pulses.*—When the calling subscriber transmits the first digit pulse train, signal equipment S41 responds in any suitable manner to cause receive relay 420 to release and reoperate responsive to each digit pulse. Contacts 421 follow to open and close the circuit to pulse relay 510 thereby repeating each digit pulse. Each time that pulse relay 510 releases, contacts 512 close to transmit a digit pulse into minor switch MS41. The pulsing path may be traced from ground (+) applied through contacts 512 to operated contacts 526, 462, rest contacts 569 and through the winding of step magnet S to (−) battery. A circuit may also be traced from contacts 462 through the upper winding of relay 460, thereby energizing it repeatedly throughout pulsing.

When step magnet S operates to take its first step thereby driving wipers 403 and 404 into its associated banks, off-normal contacts 401 open and 402 close. When contacts 401 open, the original energizing path for primary delay relay 460 is broken so that this relay must hereinafter depend upon the energizing current that it receives through its upper winding; or, stated another way, during the interval between each digit pulse, primary delay relay 460 is deenergized but it continues to hold due to its slow release characteristics. Also during the interpulse time, release delay relay 530 is deenergized when contacts 513 open; however, it too remains operated over this period due to its slow release characteristics.

Step magnet S continues to be operated by each digit pulse. It drives wipers 403 and 404 further into the banks at the rate of one step per digit pulse. Assuming that three digit pulses are received, wiper 403 is left standing on the third terminal to which strap D1 is connected. Since no further pulses are received after the third pulse, in the case assumed, primary delay relay 460 restores. In doing so, it closes contacts 463. A circuit is now completed for operating a particular digit relay depending upon the position to which the minor switch has been stepped. In this case, it is assumed that there were three digit pulses; therefore, a circuit is completed from (−) battery through the winding of relay 450, rest contacts 455, strap D1, shorting brush 403, contacts 445, 463, 528, and master ground conductor MG′ to ground (+) at operated contacts 534.

Digit relay 450 operates. The purpose of this relay is to register the tens group that includes the called line. Contacts 451 open to break still a further point in the dial tone circuit. Contacts 452 close to release the minor switch. This circuit may be traced from ground (+) to contacts 441, operated contacts 452, operated off-normal contacts 402, the winding of release magnet R, to (−) battery. Magnet R operates and the switch drops back to normal thereby closing off-normal contacts 401. Digit relay 450 locks in an operated condition over contacts 454, rest contacts 567 and master ground conductor MG′ to ground (+) on contacts 534. Contacts 454 are arranged to make before contacts 455 break so that digit relay 450 is held positively during its operation period.

A circuit is completed through resting off-normal contacts 401 for operating transfer relay 440, the circuit being from (−) battery through the winding of relay 440, rest contacts 442, operated digit relay contacts 453, resting off-normal conatcts 401, operated contacts 528 and 534 to ground (+). A purpose of the transfer relay is to transfer the minor switch control circuit to a units digit relay. Incidentally, primary delay relay 460 reoperates in parallel with transfer relay 440. This circuit may be traced from (−) battery over the lower winding of relay 460, resting off-normal contacts 401, operated contacts 528 and 534 to ground (+). Transfer relay 440 opens contacts 441 thereby breaking the circuit over which the minor switch was released. Contacts 443 close to lock transfer relay 440 to master ground by way of contacts 567 and 534. Again, contacts 443 are arranged to make before contacts 442 break so that transfer relay 440 is held positively throughout armature travel time. Contacts 444 close and 445 open thereby transferring digit registering control from the upper to the lower bank of minor switch MS41.

The circuit is now prepared to receive the second digit pulse train. Receive relay 420 is released to open contacts 421 responsive to each digit pulse in the second digit pulse train. Responsive thereto, pulse relay 510 releases and reoperates repeatedly. On each release of the pulse relay, a circuit is completed from contacts 512 over contacts 526 and 462 to primary delay relay 460 and in parallel therewith through contacts 569 to step magnet S. Responsive to each digit pulse, step magnet S drives wipers 403 and 404 one step further into the bank of contacts. Assuming that seven digit pulses are received, wiper 404 is left on the seventh terminal to which strap D2 is connected. A circuit is completed for operating digit relay 560 as a registration of the second digit and as an indication that the particular circuit shown is to be seized. If the minor switch had been directed to another bank contact in the lower level, a corresponding digit relay in a different selector would operate at this time as an indication that that circuit was called.

Incidentally, trunk selector 114 may be associated with either a manual exchange such as cordless P. B. X 116 or a dial exchange such as 108, for example. Any selector such as selector 114 may serve either a dial exchange or a cordless P. B. X but a selector of this type would never serve both. Assuming that the trunk selector 114 is arranged to connect with cordless P. B. X 116, contacts 612 are provided in an adapter circuit and wiring Z is omitted. On the other hand, if this selector is arranged to seize dial P. B. X 108, contacts 612 are omitted and wiring Z is used. In either event, digit relay 560 is operated over a circuit which may be traced from (—) battery through the winding of relay 560, contacts 612 (or wiring Z, as the case may be), strap D2, wiper 404, operated contacts 444, rest contacts 463, and operated contacts 528 and 534 to master ground (+). If this were a call to a dial exchange, contacts 561*a* would now close to seize a line circuit of the dial exchange. However, if it is assumed that digit relay 560 serves a cordless P. B. X, contacts 561*a* are not used. In this case, talking conductors T1 and R1 are connected through contacts 562 and 564, while calling bridge relay 570 is disconnected from the talking conductors at contacts 561 and 563. Digit relay 560 locks to master ground by way of contacts 612, 566 and 534. Contacts 567 open to release digit relay 450 and transfer relay 440 since they are no longer necessary. Contacts 568 close; however, they have no effect at this time.

*P. B. X.*—Contacts 565 close to light an incoming lamp at the operator's position thereby indicating to her that a call is to be answered. The circuit for this operation may be traced from ground (+) on contacts 565, rest contacts 623, incoming lamp conductor INC, through the filament of lamp L701, contacts K713 and the winding of relay 650 to (—) battery. Alarm relay 650 operates in series with incoming lamp L701. Contacts 651 close to complete a circuit from ground (+) on busy key K800 through contacts K805, 651, a retard coil RC61, contacts 661 and the winding of buzzer 660 to (—) battery. The buzzer operates and opens contacts 661 thereby breaking its own circuit and causing it to buzz. This buzzer continues to sound in the well known manner until the operator at the cordless P. B. X answers the call.

Ring back tone is transmitted to the calling subscriber to inform him that a signal has been transmitted to the operator. The path for ring back tone may be traced from the generator lead, Fig. 6, through contacts 621, 611, operated contacts 562, conductor T1, hybrid circuit H41, modulator M41 and microwave equipment MW41 to antenna 112.

The operator notes the sound of the buzzer and the incoming lamp L701 signal and proceeds to select any idle link to complete the call, for example, link 3 which includes key K700. The purpose of this key is to extend the conversation conductors to a point where they may connect with the line of the called subscriber. Therefore, to answer the call she moves this key so that the contacts K701—K706 are operated. Contacts K702 complete an obvious circuit for operating cut-off relay 730. Relay 730 operates and opens contacts 731 and 732 thereby cutting off the battery normally supplied through the winding of calling bridge relay 740. This battery is used on calls which are local to the P. B. X.

The operator also throws her talk key K910 which is associated with link 3. The purpose of this key is to connect the operator to talk to the calling subscriber and to retire the calling signals including lamp INC and buzzer 660. This closes contacts K911—K913. A circuit may be traced from ground (+) through contacts K911, K705, conductor TK, to (—) battery through the windings of relays 630 and 620 in parallel.

Relays 620 and 630 operate. Contacts 623 open to break a circuit formerly extending through contacts 565, 623, conductor INC, the filament of lamp L701, contacts K713, and the winding of relay 650 to (—) battery; therefore, lamp L701 and buzzer 660 are retired. Contacts 621 open to terminate ring-back tone. Contacts 631 and 632 have no function at this time. Contacs 633 apply ground to conductor HS thereby operating switch relay 430 over an obvious circuit.

Responsive to the operation of relay 430, contacts 431 and 432 close to connect the demodulator into the talking circuit. The purpose of this relay and these contacts is to keep the circuit from singing or howling until the line side of hybrid circuit H41 is properly terminated, i. e., the talking conductors have been extended to an operator's or subscriber's telephone.

The operator is now connected with the calling subscriber and may inquire to determine the destination of the call. The talking circuit may be traced from operator position OP800 through tip and ring conductors T2 and R2, contacts K913 and K912, contacts K704 and K703, contacts K601 and K602, conductors T1 and R1 to hybrid circuit H41, modulator M41, microwave equipment MW41 and antenna 112 to channel 1 and the calling subscriber. The talking battery may be traced during this portion of the call from battery B81 (lower center of Fig. 8) through the winding of an unnumbered relay, transmitter $T_1$ of operator's telephone set 117 and hookswitch contacts HS81 to ground (+) G81. Upon learning the destination of the call, the operator moves a suitable key for connecting the incoming talking conductors with the local talking conductors of the called line.

Assuming that the subscriber at station C has been called, operator OP800 moves key K920 so that contacts K921—K925 are closed. A circuit is now completed from ground (+) through contacts K921, K706, and conductor LK to operate relay 610 in adapter 115. Contacts 612 open to release digit relay 560. Contacts 611 open to break still another point in the ring back tone circuit. Ringing key K800*a* is operated to the left and subscriber C is rung, the ringing current being traced from the generator conductor over contacts K801, conductor R3, the subscriber C substation, conductor T3, operated contact key K804 to ground (+). The operator returns key K800*a* to normal after she has rung the called subscriber. When called subscriber C answers, the talking path is completed over conductors T3 and R3, contacts K803 and K802, through similar contacts in links 1 and 2, operated contacts K922 and K923, operated contacts K704 and K703, rest contacts K601 and K602, conductors T1 and R1, hybrid circuit H41, modulator M41 and demodulator D41, microwave equipment MW41 and over antenna 112 to channel 1.

Means is provided in dial trunk selector 114 to furnish talking battery to the called subscriber served by the P. B. X. That is, calling bridge relay 570 operates, its purpose being to extend talking battery over part of the above traced talking circuit to subscriber C. The operate circuit for relay 570 and the talking battery circuit are extended from (—) battery through the upper winding of calling bridge relay 570, contacts 561 on relay 560, conductor T1 to subscriber C, and the ground (+) connection extends through the lower winding of calling bridge relay 570, released contacts 563 and conductor R1 to subscriber C. Contacts 572 close thereby operating release delay relay 550 over an obvious circuit. Contacts 552 open thus extinguishing the "busy and hold" lamp L700 indicating to the operator that the called station has answered. Formerly, this circuit extended from (—) battery through the filament of lamp L700, conductor H, contacts 532, 541 and 552 to ground (+).

The operator has completed her service therefore she restores talk key K910 to its normal position (the operator may restore the talk key immediately after ringing the local station), thus breaking the talking connection to her headset. Contacts K911 open thereby releasing relay 630. It might be recalled that relay 630 originally operated over the circuit which may be traced from (−) battery through the windings of relay 630, conductor TK, contacts K705 and K911 to ground (+). Relay 630 releases; however, relay 620 which originally operated in parallel to relay 630, continues holding and does not release since it has locking contacts 622 which connect with master ground conductor MG′ and ground (+) on operated contacts 534. Contacts 633 open because they are no longer necessary to hold switch relay 430 operated because release delay relay 550 has closed contacts 553.

Conversation follows.

*Release.*—At the termination of the call the particular sequence of circuit functions depend upon which subscriber is the first to hang up. Assuming first that the called subscriber restores his receiver before the calling subscriber, calling bridge relay 570 releases when the called subscriber hangs up to break the talking loop which extended from (−) battery through the upper winding of calling bridge relay 570, rest contacts 561, conductor T1, contacts K601, K704, K925, contacts in links 2 and 1, rest contacts K803, tip conductor T3, called subscriber station C, ring conductor R3, normal contacts K802, contacts in links 1 and 2, contacts K922, K703, K602, ring conductor R1, rest contacts 563 to ground (+) through the lower winding of calling bridge relay 570.

When calling bridge relay 570 releases, it opens contacts 572, thereby causing the restoration of release delay relay 550. Contacts 553 open thereby releasing switch relay 430. Contacts 552 close to light busy and hold lamp L700 via contacts 541, 532, conductor H, and lamp L700 to (−) battery as an indication that the called subscriber has hung up but that the selector is still busy because the calling subscriber has not yet hung up. It might be noted that busy and hold lamp L700 is an indication of an unattended and incomplete call rather than a mere busy lamp in the normal meaning of the word.

Nothing further happens until the calling subscriber hangs up. At that time signal equipment S41 is operated by any suitable means (not shown) to release receive relay 420. Responsive thereto, contacts 421 open thus breaking a holding circuit for pulse relay 510 which releases. When relay 510 releases, contacts 513 open thereby restoring release delay relay 530. Responsive thereto, contacts 531 close to light supervisory lamp L703 as an indication that the operator should return the keys in the cordless P. B. X to normal. The circuit for lighting this lamp extends from ground (+) through normal contacts 552, 541, 531, conductor SR, operated contacts K701, 733, 741, the filament of lamp L703, alarm relay 650 to (−) battery. Relay 650 closes contacts 651 thereby operating buzzer 660 over a circuit which may be traced from (−) battery through relay 660, contacts 661, 651, K805 and busy key K800 to ground (+). Lamp L703 and buzzer 660 cooperate to indicate to operator OP800 that the call should be taken down. Relay 530 also opens contacts 534 thereby removing master ground so that any remaining relays that are operated are restored at this time. One of these relays is release delay relay 520 which had been locked over the circuit including contacts 523 and 534. When relay 520 restores, contacts 525 close to release minor switch MS41. This circuit includes the contacts 559, 525 and operated off-normal contacts 402. Release magnet R operates causing minor switch MS41 to drop back thus opening off-normal contacts 402 while closing contacts 401. With the restoration of release delay relay 530 (and consequently the breaking of master ground (+) connection at contacts 534), the dial trunk selector circuit 114 is returned to normal and ready for the next call.

When operator OP800 observes the lit condition of lamp L703 together with the sounding of buzzer 660 she restores keys K700 and K920. Relay 730 releases when key contact K702 is open and adapter relay 610 restores when key contacts K706 and K921 release.

*Outgoing call from P. B. X*

The next call to be described is one which originates in the cordless P. B. X 116. For the purpose of explaining this type call, it is assumed that subscriber C is calling another subscriber to whom access is had by way of channel 1.

*Seizure.*—To place this call, subscriber C removes his receiver from its hookswitch. Responsive thereto, bridge relay 910 operates. The circuit for this operation may be traced from ground (+) through its upper winding, key contacts in link 4, rest contacts K924, contacts in links 2 and 1, resting contact K803, tip conductor T3, subscriber subset C, ring conductor R3, key contacts K802, contacts in links 1 and 2, rest contacts K923, key contacts in link 4, to (−) battery through the lower winding of relay 910 which operates. Responsive thereto, a circuit is completed from ground (+) through operated contacts 911, lamp L901, resting key contacts K956, and through the winding of alarm relay 650 to (−) battery. Contacts 651 close causing buzzer 660 to be sounded. The circuit for this includes contacts 661, 651, K805 and busy key K800 to ground (+).

Operator OP800 notices the lit condition of lamp L901 and the audible signal of buzzer 660 and she responds by operating a key in any idle link. For example, she may operate key K920 if link 3 is then idle. She also operates her talk key K910 so that she may inquire of subscriber C to determine the destination of the call.

Calling bridge relay 740 operates responsive to operation of key K920, the circuit being from ground (+) through contacts 732, operated contacts K925, rest contacts in links 2 and 1, rest contacts K803, tip conductor T3, subscriber station C, ring conductor R3, key contacts K802, resting key contacts in links 1 and 2, operated contacts K922, contacts 731 and the winding of calling bridge relay 740 to (−) battery. The operator converses with the calling subscriber to determine the destination of the call. The talking path includes conductors T2 and R2, operated contacts K912, K913, K925 and K922, and conductors T3 and R3 to subscriber C. Upon learning the destination of the call, operator OP800 actuates suitable keys.

If the call were to another local subscriber, operator OP800 would move a key (not shown) corresponding to key K920.

On the other hand, it is assumed that the call is for a subscriber who must be reached by way of antenna 112 and channel 1. Therefore, operator OP800 moves key K700 to interconnect the local subscriber and the outgoing trunk circuit. Adapter relays 620 and 630 operate to prepare dial trunk circuit selector 114. The circuit for operating these relays extend from (−) battery through the windings of relays 620 and 630 in parallel, conductor TK, operated contacts K705 and K911 to ground (+). Relay 620 holds incoming conductor INC open at contacts 623, thereby preventing any false incoming signals at lamp 701.

Contacts K702 operate cut-off relay 730 thereby opening contacts 731 and 732 to disconnect calling bridge relay 740. This is because talking battery will be furnished from this time on by way of the windings of calling bridge relay 570. Contacts 733 close to give supervision on release.

Calling bridge relay 570 operates to furnish talking battery to subscriber C and to receive and repeat digit pulses. The circuit for this relay extends from (−) battery through the winding of relay 570, contacts 561, conductor T1, contacts K601, operated contacts K704, K925, resting key contacts in links 2 and 1, contacts K803, tip conductor T3, the calling subscriber station C, ring conductor R3, contacts K802, resting key contacts in links 1 and 2, operated contacts K922, K703, K602, ring conductor R1, resting contacts 563 and the lower winding of calling bridge relay 570 to ground (+).

Calling bridge relay 570 operates and closes contacts 572 thereby operating release delay relay 550. The purpose of this relay is to furnish master ground and thereby hold the circuit operated throughout digit pulsing. Send relay 410 operates over a circuit from (−) battery through the winding of relay 410, contacts 571 and 522 to ground (+). This relay closes contacts 411 thus causing signal equipment S41 to transmit a seizure signal to all microwave stations on channel 1.

Release delay relay 550 operates. Responsive thereto, contacts 558 close to apply master ground to conductor MG'. This ground is called "master ground" because it holds most of the relays in dial trunk selector 114 in their operated condition. Hence, when this ground marking is removed, substantially all relays release. For example, one circuit may be traced from ground (+) through operated contacts 558, master ground conductor MG' and operated contacts 622 and through the lower winding of relay 620 to (−) battery. This relay is now locked operated independently of the continued application of ground at contacts K911. Contacts 557 close to prepare a circuit for digit relay 450. Contacts 554 close to extend a ground marking to the start conductor of tone generator TG51. This generator provides dial tone. Contacts 553 close to operate switch relay 430 over an obvious circuit. The purpose of this relay is to close contacts 431 and 432 thereby operatively connecting demodulator D41 to the microwave equipment MW41 since hybrid circuit H41 will not sing when it is thus properly terminated.

Contacts 551 close to extend dial tone to the calling operator. The circuit for dial tone extends from tone generator TG51 over the tone conductor, contacts 551, 521, 451, tip conductor T1, contacts K601, K704, K913, tip conductor T2, to the operator's headset, and back over the circuit including ring conductor R2, contacts K912, K703, K602, ring conductor R1, contacts 563 to ground (+) through the lower winding of calling bridge relay 570.

*Dialing.*—The circuit is now prepared to receive digit pulses and nothing further happens until operator OP800 moves dial D801. In preparation for dialing, operator OP800 moves key K620 thereby opening the talking circuit at contacts K601 and K602 while closing a dial circuit at contacts K603 and K604. Following this, the operator moves dial D801. This dial is arranged to break the talking loop which now extends from conductor T1 over key contact K603, a dial conductor, dial D801 and back over another dial conductor, key contacts K604, ring conductor R1 and contacts 563 to ground (+) through the lower winding of calling bridge relay 570.

Each time that dial D801 opens this loop, calling bridge relay 570 releases to transmit a digit pulse by opening contacts 571. It might be recalled that send relay 410 originally operated when calling bridge relay 570 operated, the circuit being from (−) battery, through the winding of send relay 410, contacts 571 and 522 to ground (+). Therefore, each time that calling bridge relay 570 opens contacts 571, send relay 410 is caused to release and correspondingly to open contacts 411. This in turn causes signal equipment S41 to repeat the digit pulse train to a distant station by way of antenna 112 and channel 1. Each time that calling bridge relay 570 restores responsive to the receipt of a digit pulse, contacts 572 are opened to deenergize release delay relay 550. However, it does not release due to its slow release characteristics. Also responsive to the first release of calling bridge relay 570, contacts 573 close to energize digit relay 450. This circuit may be traced from (−) battery through the winding of digit relay 450, rest contacts 455, 524, operated contacts 557 and restored contacts 573 to ground (+).

Digit relay 450 is operated responsive to the receipt of the first digit pulse. It locks by way of its contacts 454 to master ground by way of contacts 567 and 558. The reason for operating the digit relay at this time is to open contacts 451 thereby terminating the transmission of dial tone to the calling operator.

After all digit pulses are sent the circuit remains in the condition described until the called subscriber answers.

When operator OP observes the answer of the called subscriber, she responds by returning talk key K910 to normal, thus releasing relay 630. Relay 620 does not release at this time since it has locked at its contact 622 to master ground conductor MG'. The circuit continues in the condition described until the conversation terminates at which time release is as described above.

*Conference call*

The next call to be described is a conference call. Referring to Fig. 1, it is assumed that various of the subscribers, such as A, B, C, etc., wish to hold a simultaneous or conference call. In this event, the operator at cordless P. B. X 116 (Figs. 6–9) is called in any suitable manner by the person placing the call. For example, the call may be placed in the manner described above in the section entitled "P. B. X." When the P. B. X operator answers the call and converses with the calling subscriber, she is informed of the fact that there is need for a conference call. Responsive thereto, she may use special conference equipment, such as link 5 which is shown in Figs. 7 and 9, for example. Link 5 is especially arranged for conference call service since it is arranged to use the line lamps for supervision of each line on a conference and provides individual battery feed relays and has a negative impedance that is adapted to compensate for loss of audio signal according to the number of telephones in the conference circuit.

To set up the conference call the operator moves talk key K950 and corresponding keys in the case of each subscriber station to be included in the conference circuit. It should be understood that the dotted lines between Figs. 9 and 7 indicate that additional facilities may be provided to accommodate other local and trunk lines, part of these facilities being keys corresponding to talk key K950. If the subscriber being called for the conference is in the office served by the cordless P. B. X, the next step is to operate intermittently a ring key corresponding to key K800 associated with that subscriber line. As each subscriber answers, a line lamp is lit dimly to give off-hook supervision.

In greater detail, the conference call is set up in the following manner. The operator receives the call in the manner explained above and determines that she must use link 5 to complete a conference call. First, she operates conference key K940. Then, assuming that local line subscriber C is to be included in the conference, she actuates key K950 and ringing key K800*a*. Contacts K804 and K801 close thereby connecting a ringing generator to conductors R3 and T3, thus signaling a local subscriber C. When local subscriber C answers and ringing key K800*a* is restored to normal, a circuit is completed for operating bridge relay 910. This circuit may be traced from ground (+) through the upper winding of relay 910, closed contacts on a talk key in link 4, contacts K924, similar resting contacts on a talk key in link 2 and a talk key in link 1, normal key contacts K803, conductor T3, the telephone set at the station serving subscriber C, ring conductor R3, closed key contacts K802, normal contacts on a talk key in link 1 and a talk key in link 2, normal contacts K923, similar normal contacts in link 4, and through the lower winding of bridge relay 910 to (−) battery. The purpose of this relay is to furnish talking battery, to control supervisory lamp L901, to control the impedance in the talking circuit and to switch the talking circuit through to the amplifier of Fig. 10.

Bridge relay 910 operates and closes contacts 911. A circuit is now completed for causing line lamp L901 to glow dimly as an indication that the called subscriber is off-hook. The circuit for this is completed from ground (+), through contacts 911, line lamp L901 and key contacts K957 to (−) battery by way of resistor R91. This lamp will continue to glow dimly until called subscriber C returns his receiver to its hookswitch to restore bridge relay 910. Contacts 912 and 913 close to connect the talking circuit from subscriber C to the conference amplifier. This talking circuit may be traced from subscriber station C over the heavily inked lines, through key K800a, unnumbered talk keys in link 1 and link 2, a similar talk key in link 4, key K950, a pair of capacitors designated C91 and C92, operated contacts K952 and K955, operated relay contacts 912 and 913, operated key contacts K941 and K942, thereby completing the talking circuit into the conference amplifier.

The conference calls may also include subscribers who are given service via the microwave channel. If this is the case, the operator moves talk key K710 or a similar key that is individual to the channel which gives service to the particular microwave channel subscriber who is to be included in the conference call. Following this, the operator dials the called party's directory number. There is no answer supervision when the subscriber served by the microwave channel answers. Hence, the dim line lamp shows only that the channel is in use on a conference call and does not give off-hook supervision.

If it is necessary to summon more than one party on the same microwave channel for the conference call, the operator dials and signals the party as indicated above. Following this, she momentarily releases talk key K710 to restore the trunk selector switches associated with the microwave channel. After this, she reoperates talk key K710, dials and signals the next microwave channel party desired for participation in the conference call. In a similiar manner, she may summon each subscriber provided that the circuit is equipped in the manner explained above in the section entitled "Listen-in-service."

*Conference amplifier*

The term "negative impedance" is used hereinafter. For an extensive treatment of this subject, reference is made to a series of articles entitled "Stabilized Negative Impedances," by E. L. Ginzton, beginning on page 140 in the July 1945 issue of the magazine Electronics.

The conventional call involves only a calling and a called telephone; therefore, telephone circuits are designed to provide normal audio transmission only when two telephone sets are connected to the line. As the impedance of each additional telephone set is introduced in parallel across the line, there is a corresponding drop in the audio level because each telephone added in parallel lowers the load impedance offered to the conversing subscriber's telephone. The drop in audio level results from mismatching and division of power. The ratio of power received at one station on a conference call of N stations to the power received on a normal call equals $$\frac{4}{N^2}$$

Therefore, some source must be provided to add power to compensate for the loss or the audio signal will drop to a level that is difficult to hear. Hence, it is obvious that some compensation must be made for the additional telephone sets if a conference call is to be completed with a maximum efficiency.

This invention utilizes an amplifier having a positive feedback circuit to provide a variable negative impedance across the talking conductors to compensate for the audio loss occasioned by the additional impedance of telephones added to the talking circuit during a conference call. Since the impedance of the additional telephones is connected across the tip and ring conductors, it is desirable to connect the negative resistance across the tip and ring conductors also, as is shown in Fig. 10. Means is provided under the control of each telephone included in the conference call for varying the amount of negative resistance introduced into the talking circuit, thereby to compensate for the impedance of that one telephone.

It is thought that the basic idea behind this invention will be better understood by an examination of Fig. 11.

This figure shows a skeletonized system and, insofar as it goes, it is the same as the system shown in Figs. 2–10 except that all circuit details possible have been omitted. For example, subscriber C is also shown in Fig. 8, bridge relay 910, contacts 914 and resistor R92 are the same as the items having those reference numerals that are shown in Fig. 9 while subscriber A is the same as subscriber A of Fig. 2 and retard coil RC700, key contacts K718, and resistor R72 are the same as those items shown in Fig. 7 and having the same reference numerals. Subscribers X and Y, together with their associated equipment, are not shown elsewhere in the drawings, but they may be connected into the circuit at the point where the dotted lines join Figs. 7 and 9.

Fig. 11 shows amplifier 117a which has a fixed voltage gain and therefore a variable output current depending mainly upon the total resistance between points "*a*" and "*b*." As each subscriber is connected into the conference call circuit, its bridge relay operates to close a contact and thereby add a resistance in parallel across points "*a*" and "*b*." As each microwave channel is connected into the conference call circuit, a resistor is also added as at contacts K718 in parallel across points "*a*" and "*b*" due to the fact that a key such as K710 (Fig. 7) has been operated. There is no need to add a resistor per station on the microwave channel because the impedance of the talking circuit looking toward the microwave channel from the P. B. X does not change with the addition of new stations.

In the particular case of Fig. 11, if subscribers A, C and X are included in a conference call, relays 1110, 910 and key K710 are operated so that contacts 1111, 914 and K718 are closed to connect resistors R111, R92 and R72 in parallel across points "*a*" and "*b*." This means that amplifier 117a is providing a particular output current for a given input signal. If subscriber Y should then join the conference, bridge relay 1112 operates its contacts 1121, resistor R112 is added to the parallel path and the total resistance across points "*a*" and "*b*" goes down. The amplifier is arranged to raise its output current responsive to this lowering of the total resistance across points "*a*" and "*b*"; hence, the negative impedance introduced by the conference amplifier goes down to substantially compensate for the impedance added to the conference circuit by the introduction of telephone set Y.

The well known formula for computing power is $$P=\frac{I^2}{R}$$

where power P is dissipated in resistor R at current I.

The conventional telephone system has fixed values for current, voltages, etc., which have been adopted as industry-wide standards. From this formula and from these standards it may be found that if "*n*" represents the total number of stations in a conference call circuit and the signal level with only two stations is considered as zero loss, the signal power ratio in a system having conventional circuit properties between a connection with the usual two stations and a conference connection with *n* stations is $$\frac{n^2}{4}$$

For example, if sixteen stations are connected into a conference call circuit the signal power ratio is 64:1. This is the equivalent of 18.062 decibles loss due to the addition of fourteen stations.

The amplifier is arranged to compensate for this loss in accordance with the number of stations connected in a conference call circuit. It is thought that a still further simplified drawing of the circuit will illustrate this feature better; therefore, Fig. 12 has been prepared to set forth the electrical equivalent of Fig. 11 with circuit elements lumped wherever possible. In Fig. 12:

$Z/N$=the net parallel impedance of the telephones on a conference call circuit. This is the useful work load of the system.
$N$=number of telephones on a conference call.
$Z$=the impedance of one phone and also equals twice the impedance of the networks provided to compensate for the two telephones that normally are included in conventional telephone calls. (All phones are assumed to have impedance which approximately equals Z.)
$-Z_1$=the negative impedance "looking" to the right at points "L" and "M."
$R$=the total resistance between points "$a$" and "$b$" in Fig. 11.
$e_1G$=the amplified signal voltage.
$G$=voltage gain of the amplifier.
$e_s$=A. C. voltage across T10 and R10.
$e_1$=that portion of the signal voltage in the conference call circuit that is applied to the amplifier input.
$i_1$ and $i_2$=currents in circuit branch.

The generation of negative impedance having frequency characteristics approximately matching the frequency characteristics of a positive impedance may be shown mathematically by the following equations which are an analysis of the circuit of Fig. 12. For the purpose of this analysis, it is assumed that the battery, various resistances and other circuit elements cooperate to provide a given signal voltage $e_s$ at points "L" and "M." It is also assumed that the amplifier has negligible output impedance, which is true because of the "emitter follower" output stage.

The formula for computing impedance in A. C. circuits is:

$$Z=\frac{E}{I} \tag{1}$$

Substituting values from Fig. 12 into Equation 1:

$$-Z_1=\frac{e_s}{i_2} \tag{2}$$

Assuming that "$r$" is so small when compared with Z that it may be neglected:

$$i_1=\frac{e_s}{z} \text{ (approximately)} \tag{3}$$

$$e_1=i_1r \tag{4}$$

Substituting the value of $i_1$ from Equation 3 into Equation 4:

$$e_1=\frac{e_s}{z}r \tag{5}$$

The output voltage equals:

$$e_1\text{G} \tag{6}$$

Substituting the value of $e_1$ from Equation 5 into Equation 6 the output voltage equals:

$$e_s\frac{rG}{Z} \tag{7}$$

$$i_2=\frac{e_1G-e_s}{R} \tag{8}$$

Substituting the value of $e_1$G from Equation 7 into Equation 8:

$$i_2=\frac{e_s\left(\frac{rG}{Z}\right)-e_s}{R}=\frac{e_s\left(\frac{rG}{Z}-1\right)}{R} \tag{9}$$

Solving Equation 9 for $$\frac{e_s}{i_2}$$

$$\frac{e_s}{i_2}=\frac{R}{\frac{rG}{z}-1} \tag{10}$$

If the value of $r$G very greatly exceeds the value of Z, Equation 2 may be rewritten as follows by using the value of $$\frac{e_s}{i_2}$$

from Equation 10:

$$-Z=\frac{R}{\frac{rG}{Z}}=z\left(\frac{R}{rG}\right) \text{ (an approximation)} \tag{11}$$

or $$Z_1=-Z\left(\frac{R}{rG}\right)$$

Thus, it is obvious that the negative impedance at points "L" and "M" looking to the right in Fig. 12 may be varied by varying resistance R, since the values of $r$, G and Z are fixed. Furthermore, the values of R, $r$ and G may be arranged to provide a negative impedance $-Z_1$ which is equal to positive impedance Z/N. Since $Z_1$ and Z/N are made equal, it is necessary that a positive impedance be added to provide the equivalent of the two telephones that are normally on a telephone line during conversation, otherwise oscillation would occur. This is provided by the two networks labeled "Z" in Fig. 12, where the resistance $r$ in series with one of them is very low in comparison to Z and thus the combination of them is approximately equal to Z/2.

The conference circuit involves three impedances which are positive impedances Z/N and Z/2 and negative impedance $$-Z\left(\frac{R}{rG}\right)$$

If $$R=\frac{R_0}{N}$$

where $R_0$ is a resistance added to constitute R for each phone added to the conference circuit and $R_0=rG$, then the negative impedance $$=\frac{-Z}{N}\left(\frac{R_0}{rG}\right)=\frac{-Z}{N}$$

This cancels the positive Z/N leaving Z/2 as the net impedance which is the same as the net impedance on a normal call thereby providing a voice transmission level equal to that of a normal call.

In résumé, the derived signal voltage, $e_1$, is proportional to the current through impedance Z produced by a given signal voltage and this is proportional to the current which the same signal voltage would produce in an actual phone of impedance Z. The amplifier multiplies this voltage $e_1$ by a factor G. The positive feedback path through resistor R allows current to flow into the conference call circuit (Z/N) which is essentially in phase with the component of current produced in the conference call circuit (Z/N) by the original signal (except in the particular phone where the signal originates). The impedance of resistor R must be high when compared to the impedance of conference call circuit Z/N in order to keep the current $i_2$ approximately in phase with voltage $e_1$G.

Figs. 11, and 12, together with their explanation above in connection with the conference call circuit, have been designed to reduce the conference call circuit to as simple a form as possible in an effort to aid understanding of the principles involved. As was pointed out before, Fig. 11 is a skeletonized circuit taken from detailed Figs. 2–10. Now, these detailed figures will be described as they relate to the conference call amplifier.

The conversation signal currents are received over conductors T10 and R10. Capacitor C101 and resistor R101 comprise a load circuit approximately equivalent to one telephone while capacitor C102, impedance Z and resistance R103 constitute another load which also is approximately equivalent to one telephone. In actual practice, impedance Z may be the vital parts of a telephone including coils, receiver and the like, or may be a network of equivalent impedance. These two load circuits are the equivalent of the impedance of the two telephones which are connected to a telephone line during a normal conversation.

The transistors are shown in a conventional form, for example, referring to the first transistor TR101, there is shown a base B101, an emitter E101 and a collector CL101. In the usual transistor circuit a signal input may be connected to either the base or the emitter while the output is taken from either the collector or the emitter. In each case there is an electrode which has neither a signal input nor a signal output connected to it. Instead, this electrode is connected to a common wire which carries either a (−) B or a (+) B potential, as the case may be. The particular connection of this electrode gives rise to the descriptive expressions "common base," "common emitter" and "common collector" which is also known as an emitter follower. For example, in the case of transistor TR101 the signal input circuit is connected to emitter E101 while the output is taken from collector CL101. The base B101 is connected via resistor R103*a* to the common conductor carrying (+) B potential; hence, transistor TR101 is called a "common base" transistor circuit. A primary characteristic of the "common base" circuit is that of all of the various transistor circuits commonly used in an amplifier, it has the lowest input resistance. Usually, a high input impedance is desirable but common base connection can be used when the signal source is low impedance, and it gives the highest voltage gain.

The all-transistor amplifier comprises five stages of PNP type transistors which are stabilized by overall negative feedback to provide a fixed gain. The transistor in the first stage (TR101) operates as a "common base" circuit. The transistors in the second and fourth stages (TR102 and TR104) are of the "common emitter" type of transistor circuits while the third and last stages (TR103 and TR105) are "emitter follower" or "common collector" circuits which serve to provide impedance transformation without voltage gain. The amplifier has low input and output impedance.

*Balanced choke coil.*—The amplifier alone does not have balanced input and output circuits. In order to use the amplifier on a balanced line, the D. C. power is fed through a balanced choke coil CH102–CH105. The arrows associated with these windings indicate the prevailing direction of flux under D. C. conditions. The positive or ground (+) potential for the amplifier is connected from key contacts K934 (Fig. 9) over conductor ST and through winding CH103 to conductor (+) B which is common to all stages. The (−) battery or negative potential is connected through windings CH104 to conductor (−) B which is also common to all stages. This type of battery connection makes both the (+) B and (−) B terminals of the amplifier follow the A. C. signal potential of tip conductor T10 to ground; furthermore, the choke coil isolates conductor T10 from ground insofar as the A. C. signal currents are concerned. The (−) battery connected through winding CH102 to conductor R10 serves to maintain the balance of tip and ring conductors T10 and R10 with respect to the office battery and ground connections. The value of capacitor C104 is selected to balance the total capacitance of the amplifier to ground. Winding CH105 and resistor R105 cooperate to complete the resistive balance. This winding may be eliminated completely if proper values are selected for other circuit elements because the effects of this winding are cumulative to the effects of winding CH102.

Resistor R106 and capacitor C107 are a noise filter and serve to prevent amplification of noise that might be superimposed on the battery. In addition thereto, capacitor C107 also provides a low impedance path between conductors (−) B and (+) B effectively to connect conductor (−) B to tip conductor T10 for A. C. currents only.

*Details of amplifier.*—An input signal is taken across section *ii* of resistor R103, this signal being a function of the voice currents carried by tip and ring conductors T10 and R10. This input signal is connected via resistor R107 and capacitor C108*a* to emitter E101 of transistor TR101 which provides the first stage of amplification. Resistors R101*a* and R103*a* furnish bias for the base of transistor TR101. In addition thereto, resistor R103*a* also serves as part of the negative feedback path used to stabilize the amplifier. That is, the output of transistor TR105 is divided by resistors R103*a* and R101*c*. That portion of the output current that is derived from resistor R103*a* is in effect in series with the voice signal that is carried by conductor T10 and is connected to the input of transistor TR101.

The amplified output voltage from collector CL101 of transistor TR101 appears across resistor R102*a* and produces a current through resistor R104*a* to base B102 of transistor TR102. Resistor R104*f* is used to help stabilize the D. C. potential applied to the base of transistor TR102.

The input to transistor TR102 from transistor TR101 is connected to base B102 and the output is taken from collector CL102. The emitter is connected to common conductor (+) B via resistor R106*a*; hence the term "common emitter" is used to describe transistor circuits of this type. There is no A. C. current by-pass for resistor R106*a*. This provides a relatively higher A. C. signal input impedance at base B102 of transistor TR102 to reduce its loading effect on transistor TR101. Stated otherwise, normally it would be desirable to provide a by-pass capacitor to prevent an A. C. drop across resistor R106*a* thereby increasing the amplification of stage TR102; however, since the base of transistor TR102 is connected to collector CL101 of the preceding stage, which is relatively high impedance, it would load transistor TR101 and thereby reduce its output. The output signal from transistor TR102 appears across collector resistor R105*a*. This output signal is fed directly to base B103 of transistor TR103.

Transistor TR103 has the signal input connected to its base B103 and the signal output taken from its emitter while its collector is connected to common conductor (−)B. Therefore, it is said to be operating as a "common collector" circuit. Collector resistor R109*a* is by-passed for A. C. by capacitor C108. Transistor TR103, like all "common collector" circuits, has relative high input impedance and low output impedance. Resistor R107*a* is used to provide a bias which helps to stabilize the D. C. voltage at the base of transistor TR103. The output of transistor TR103 appears across resistor R101*b* and is fed through resistor R102*b* to the base of transistor TR104.

In transistor TR104 the signal input is via the base, the output is taken from the collector and the emitter is connected to the common (+)B conductor. This is called a "common emitter" circuit. The output signal is developed across resistor R103*b* while resistor R104*b* provides self-bias and capacitor C109 by-passes resistor R104*b* insofar as the A. C. signal current is concerned.

Transistor TR105 has a signal applied to its base and taken from its emitter while the collector is connected to the (−)B conductor. This arrangement is called a "common collector" circuit. One characteristic of this type of circuit is that it provides an output having a very low impedance so that the amplifier voltage gain is not effected by variations in load impedance. Capacitor C100*a* serves to isolate the D. C. potential of the emitter circuit of transistor TR105 from the load circuit.

Capacitor C101*a*, which is connected between transistors TR102 and TR103, provides a high frequency negative feedback path through transistors TR103, TR104 and TR105 to prevent oscillation which might otherwise occur due to a phase shift of the signal in the power output stage. The output voltage across resistor R107*b* is fed through resistor R101*c* to resistor R103*a*. At this point a portion of the output voltage is connected in series with the input signal voltage. These coupling and feedback circuits provide an amplifier having all stages D. C. coupled, and a D. C. coupled negative feedback path. Since the gain of the amplifier is reduced by the negative feedback circuit, the signal gain depends primarily upon the feedback ratio as determined by resistors R101*c* and R103*a*. This ratio is selected to stabilize the amplifier gain against variations of gain by individual transistor stages. The emitter resistors R107, R106*a*, R101*b*, R104*b* and R107*b* also help to stabilize each stage against variations in transistor characteristics.

*Call to dial exchange*

Dial trunk selector 114 also may be used to complete a call to a dial exchange. For example, the call may be to subscriber B. It should be understood that a dial trunk selector such as 114 may serve either a dial exchange or a P. B. X. It would not serve both. In this case, dial trunk selector 114 operates on an incoming call in the manner described above in connection with the call to subscriber C, with the following exception. Digit pulses are repeated by pulse relay 510 at contacts 511 to the dial exchange. Since these digit pulses are to set switches in the dial exchange, it is obvious that they must occur after the two digit pulses used to drive minor switch MS41 have been received. Therefore, it may be recalled that at this time digit relay 560 is locked in an operated position. This time wiring Z is used and contacts 612 are not present since adapter 115 is used only on calls to cordless P. B. X 116. The holding circuit for digit relay 560 may be traced from (−) battery through the windings of relay 560, wiring Z, contacts 566, master ground conductor MG′, and contacts 534 to ground (+).

Pulse relay 510 follows incoming impulses as they are repeated at contacts 421 by receive relay 420. Responsive to each incoming pulse, relay 510 releases to open contacts 513 thereby deenergizing relay 530. Nevertheless, this relay continues to be held throughout pulsing due to its slow release characteristics. Contacts 512 close to operate primary delay relay 460. The circuit for this may be traced from ground (+) through contacts 512, 526, 568 and the winding of primary delay relay 460 to (−) battery. The reason for operating this relay at this time is to close contacts 461 thereby shunting the inductive effect of relay 540 which is connected in the talking circuit. Also responsive to each incoming digit pulse, contacts 511 are opened to repeat a dial pulse to a calling bridge relay in the dial exchange. The pulsing circuit may be traced from conductor T5, over contacts 561*a*, 562, 511, 461 and conductor R5 to the dial exchange. Pulsing continues until all suitable switches in the dial exchange have been set. At the end of each digit pulse train, relay 460 releases to open contacts 461. Relay 540 operates in the pulsing circuit when contacts 461 open. Responsive thereto, a circuit is completed from wiring W (center of right-hand edge of Fig. 5), over operated contacts 542, and conductor HS, to energize switch relay 430, thereby closing contacts 431 and 432 to connect demodulator D41 to hybrid circuit H41. If the dial exchange provides answer supervision by means of ground on the HS conductor, wiring W is omitted.

In the case of outgoing calls, the dial exchange completes a circuit across conductors T6 and R6 and contacts 561 and 563 to operate calling bridge relay 570. A ground marking is then extended over conductor S6 to furnish master ground until termination of the call. Otherwise, an outgoing call from the dial exchange is the same as an outgoing call from cordless P. B. X 116.

*Miscellaneous*

A resistor-capacitor circuit has been shown in Fig. 5 and marked "SP." This circuit provides spark protection across pulsing contacts 511.

The circuit drawing has been made in an effort to provide a complete understanding of the invention and not to limit the invention to the specific embodiment shown; therefore, it is my invention to cover in the attached claims all modifications which may fall within the true scope of my invention.

What I claim is:

1. In a telephone system, the combination comprising; means for providing at least one voice channel, said voice channel comprising a plurality of stations, each of said stations including interrupter means normally operative at a first rate of speed for providing electrical currents which are indicative of busy conditions, means for transmitting digit indications over said channel to each of said stations, means operative simultaneously at each of said stations for registering a designation of one of said stations responsive to the receipt of said digit indications, and means selectively responsive to said registration at one of said stations for changing the rate of speed of said interrupter means at only said one station to provide ringing current at said one station, whereby said interrupters furnish ringing current at said one station and busy tone at each of the remainder of said stations.

2. A telephone system comprising a plurality of subscriber stations, at least one channel including a plurality of interconnected terminals, at least one of said subscriber stations located at each of said terminals, a dial controlled switch at each of said terminals, means responsive to dial signals transmitted over said channel for simultaneously operating each of said switches, means responsive to operation of said switches for registering a first digit, means responsive to additional dial signals transmitted over said channel for thereafter operating said switches to register a second digit, means including an interrupter at each of said terminals for normally providing interruptions at a first of two rates of speed, means responsive to operation of said switches for causing one of said interrupters to operate at the other of said two rates of speed at a particular one of said terminals depending upon the numerical values of said two registered digits, whereby said one of said interrupters furnishes current interrupted at said other rate of speed at said one terminal for signalling a call subscriber and the remainder of said interrupters furnish current interrupted at said first rate of speed at all other of said terminals for giving a busy indication.

3. The telephone system of claim 1 wherein each of said interrupters comprises; capacitor means, a self-interrupting relay comprising a winding, said capacitor means being connected in series with said relay winding, said means for changing said rate of speed comprises resistor means, and means for effectively connecting said resistor means in series with said relay winding and said capacitor means.

4. The telephone system of claim 2 wherein each of said interrupters comprises; capacitor means, a self-interrupting relay comprising a winding, circuit means for connecting said capacitor means in series with said relay winding, said means for changing said rate of speed comprises resistor means, and means for effectively connecting said resistor means in series circuit with said relay winding and said capacitor means.

5. The telephone system of claim 4 and means selectively responsive to said registration of one of said digits for effectively eliminating said resistor means from said series circuit including said relay winding and said capacitor means at said one terminal.

6. A telephone system comprising a plurality of telephone stations, an interrupter relay comprising a winding, break contacts and other contacts at each of said stations, a resistor, capacitance means, circuit means for normally connecting said winding, break contacts, capacitance means and resistor in series thereby causing said interrupter relay to operate at a given rate of speed, means responsive to a call to one of said stations for shunting said resistor if said station is then idle thereby causing said interrupter relay to operate at a different rate of speed 7. The telephone system of claim 6 and means for effectively eliminating said resistor responsive to the completion of a call to said one station if said station is not then busy, a source of tone, a source of ringing current, means for connecting both said source of tone and said source of ringing current through said other contacts of said interrupter relay whereby said relay functions at one rate of speed to provide busy tone and at a different rate of speed to provide interrupted ringing current.

8. A microwave telephone system comprising a plurality of subscriber stations each including means for indicating on-hook and off-hook conditions, multiplexing equipment comprising a hybrid circuit, a demodulator normally disconnected from said hybrid circuit, a switch relay for connecting said hybrid circuit to said demodulator circuit, means for operating said switch relay responsive to an off-hook condition at one of said subscriber stations, means for signaling a called one of said subscriber stations comprising a switch selectively operated in accordance with the number of digit pulses received, means responsive to said selective operation for signaling a called one of said subscribers, means for releasing said switch without restoring said switch relay, and means for thereafter reoperating said switch to selectively signal a different called subscriber whereby a plurality of called subscribers may be summoned to a conference call.

9. A telephone system comprising a channel including a plurality of stations, a dial trunk selector and a cordless P. B. X at one of said stations, an adapter for interconnecting said dial trunk selector and said cordless P. B. X, a source of signaling current in said adapter, a signal, means in said cordless P. B. X for operating said signal, and means responsive to an incoming call over said channel to said one station for connecting said source of signaling current to provide ring-back tone to said calling subscriber and for simultaneously operating said signal in said cordless P. B. X to signal the presence of an incoming call.

10. The telephone circuit of claim 9 and a relay in said adapter circuit, means for operating said relay responsive to answer supervision from said cordless P. B. X, means responsive to operation of said relay in said adapter circuit for terminating said ring-back tone and for terminating said signal in said cordless P. B. X.

11. A telephone system comprising a channel, a dial trunk selector comprising a switch and accessible to said channel, a cordless P. B. X including an operator position, an adapter circuit for interconnecting said selector and said P. B. X, a plurality of local subscriber lines connected for service through said cordless P. B. X, a plurality of calling bridge relays in said cordless P. B. X normally connected to furnish talking battery to said subscriber lines, a calling bridge relay in said dial trunk selector for furnishing talking battery on calls over said channel, means responsive to calls incoming to said trunk selector and for a called one of said subscriber lines for connecting said calling bridge relay in said selector to furnish talking battery to said called line and for disconnecting said calling bridge relay in said cordless P. B. X normally connected to furnish talking battery to said called line.

12. In a telephone system, a dial trunk selector comprising a switch, a cordless P. B. X and an adapter for interconnecting said selector and said P. B. X, means for extending a call through said trunk selector, said adapter and said cordless P. B. X to a called subscriber line, means in said dial trunk selector for furnishing talking battery, means in said P. B. X for normally furnishing talking battery on calls extended through said P. B. X, means for disconnecting said normal talking battery supplying said P. B. X and for substituting said talking battery supply in said dial trunk selector on calls through said trunk selector.

13. A telephone system comprising a dial trunk selector, means for transmitting a plurality of digit pulse trains to said dial trunk selector, means in said dial trunk selector for registering the numerical value of each of said digit pulse trains, a source of talking battery in said dial trunk selector, a first relay in said dial trunk selector, means responsive to the registration of a predetermined digit for operating said first relay, means controlled by said first relay for disconnecting said source of talking battery, a private branch exchange, an adapter circuit for interconnecting said dial trunk selector and said private branch exchange, a source of talking battery normally connected to furnish talking battery on calls extended through said private branch exchange, means in said adapter circuit for releasing said first relay for connecting said source of talking battery in said dial trunk selector to furnish talking battery, and means in said private branch exchange responsive to trunk calls for disconnecting said source of talking battery normally connected in said private branch exchange.

14. In a telephone system comprising a plurality of stations, the combination comprising, means at each of said stations for interrupting electrical circuits, means including capacitive reactance for controlling the rate of speed at which said interrupting means operates, means including an impedance for controlling the time constant of said last named means, and means responsive to calls to one of said stations for selectively changing said impedance at said one station thereby changing the rate of speed of said interrupting means at said one station.

15. The telephone system of claim 14 and means for providing continuous busy tone, means for providing continuous ringing current, and means for connecting said tone and said ringing current via said electrical circuits whereby said interrupting means functions at one rate of speed to provide interrupted busy tone and at a different rate of speed to provide interrupted ringing current.

16. A telephone system comprising a plurality of subscriber stations, each including means for indicating on-hook and off-hook conditions; means for multiplexing conversations extended through said system comprising, means for terminating four wire circuits, and means for demodulating electrical currents, said demodulating means being normally disconnected from said terminating means; means responsive to an off-hook condition for interconnecting said demodulating means and said terminating means; means for signaling a called subscriber responsive to signals extended through said system; means for releasing said signaling means without disconnecting said demodulating means from said terminating means; and means for thereafter reoperating said signaling means responsive to other signals extended through said system for signaling a different called subscriber.

17. A telephone system comprising, a plurality of subscriber lines and trunks, means for extending undulating currents over multi-station channels, means at certain of said stations for selecting one of said trunks, means at said certain stations for manually interconnecting said lines, adapter means at said certain stations for interconnecting said trunk selecting means and said manual means, means in said adapter means for extending signaling currents over said channels, means in said manual means for signaling the presence of unanswered calls and means responsive to an incoming call from said channel to said manual means for operating said unanswered call signaling means and for simultaneously operating said signal extending means.

References Cited in the file of this patent

UNITED STATES PATENTS

| | | |
|---|---|---|
| 1,965,435 | Shimazu | July 3, 1934 |
| 2,040,462 | Bown | May 12, 1936 |
| 2,307,855 | Pearce | Jan. 12, 1943 |
| 2,495,191 | Wallace | Jan. 17, 1950 |
| 2,617,886 | Bartha | Nov. 11, 1952 |

FOREIGN PATENTS

| | | |
|---|---|---|
| 413,442 | Great Britain | July 19, 1934 |